United States Patent
Leonelli et al.

(10) Patent No.: US 10,798,780 B2
(45) Date of Patent: Oct. 6, 2020

(54) METHOD AND APPARATUS FOR CREATING AND MANAGING CONTROLLER BASED REMOTE SOLUTIONS

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 454 days.

(21) Appl. No.: 15/683,190

(22) Filed: Aug. 22, 2017

(65) Prior Publication Data

US 2018/0054850 A1 Feb. 22, 2018

Related U.S. Application Data

(63) Continuation-in-part of application No. 15/386,180, filed on Dec. 21, 2016.

(Continued)

(51) Int. Cl.
*H04W 84/18* (2009.01)
*G06F 9/54* (2006.01)
(Continued)

(52) U.S. Cl.
CPC .......... *H04W 84/18* (2013.01); *G06F 3/048* (2013.01); *G06F 9/547* (2013.01); *H04L 67/10* (2013.01);
(Continued)

(58) Field of Classification Search
CPC ..................................................... H04W 84/18
See application file for complete search history.

(56) References Cited

U.S. PATENT DOCUMENTS

| | | | |
|---|---|---|---|
| 6,065,053 A | 5/2000 | Nouri et al. | |
| 6,108,715 A | 8/2000 | Leach et al. | |

(Continued)

FOREIGN PATENT DOCUMENTS

| | | | |
|---|---|---|---|
| CN | 1821964 A | 6/2003 | |
| CN | 201017215 Y | 2/2008 | |

(Continued)

OTHER PUBLICATIONS

International Search Report and Written Opinion dated Nov. 15, 2017 for PCT Application No. PCT/US2017/047944.

(Continued)

*Primary Examiner* — Suraj M Joshi
(74) *Attorney, Agent, or Firm* — Moser Taboada

(57) ABSTRACT

A method and apparatus for monitoring and controlling the controller based remote solution comprises receiving either a selection of a blank template in which a controller device is selected, and a solution corresponding to a conventional system is built, or a selection of a pre-defined solution comprising a controller device installed in a conventional system. Input for at least one parameter of the solution is received. The parameter comprises a monitored parameter of the conventional system, a condition for the monitored parameter, or a remote program parameter for executing a remote program. Based on the received inputs, a controller program (AGCP) is generated automatically, the AGCP for execution by the controller device. The AGCP comprises a call for executing the remote program based on the condition being met, and is sent for installation on the controller device.

20 Claims, 15 Drawing Sheets

Related U.S. Application Data

(60) Provisional application No. 62/377,963, filed on Aug. 22, 2016.

(51) Int. Cl.
| | | |
|---|---|---|
| *G06F 3/048* | (2013.01) | |
| *H04L 29/08* | (2006.01) | |
| *H04W 4/70* | (2018.01) | |

(52) U.S. Cl.
CPC ............ *H04L 67/125* (2013.01); *H04W 4/70* (2018.02); *H04L 67/12* (2013.01)

(56) References Cited

U.S. PATENT DOCUMENTS

| | | | |
|---|---|---|---|
| 6,158,031 A | 12/2000 | Mack et al. | |
| 6,895,573 B2 | 5/2005 | Norgaard et al. | |
| 7,086,014 B1 | 8/2006 | Bartz et al. | |
| 7,246,319 B2 | 7/2007 | Alden et al. | |
| 8,055,386 B2 | 11/2011 | McCoy et al. | |
| 8,086,744 B2 | 12/2011 | Abdullah et al. | |
| 8,990,787 B2 | 3/2015 | Balassanian | |
| 2002/0194313 A1 | 12/2002 | Brannock | |
| 2003/0061274 A1 | 3/2003 | Lo | |
| 2003/0204560 A1 | 10/2003 | Chen et al. | |
| 2004/0010734 A1 | 1/2004 | Ghercioiu et al. | |
| 2004/0193635 A1 | 9/2004 | Hsu et al. | |
| 2004/0221238 A1 | 11/2004 | Cifra et al. | |
| 2004/0249944 A1 | 12/2004 | Hosking et al. | |
| 2005/0114644 A1 | 5/2005 | Chu et al. | |
| 2005/0114854 A1 | 5/2005 | Padisetty et al. | |
| 2005/0177269 A1 | 8/2005 | Funk | |
| 2005/0256964 A1 | 11/2005 | Dube | |
| 2005/0283786 A1 | 12/2005 | Dettinger et al. | |
| 2006/0271537 A1 | 11/2006 | Chandrasekharan et al. | |
| 2007/0174037 A1 | 7/2007 | Ling | |
| 2007/0186246 A1 | 8/2007 | Goldhor | |
| 2008/0092073 A1 | 4/2008 | Shih et al. | |
| 2009/0095807 A1 | 4/2009 | Dickerson et al. | |
| 2009/0198770 A1 | 8/2009 | Jiang | |
| 2009/0307105 A1 | 12/2009 | Lemay et al. | |
| 2010/0271989 A1 | 10/2010 | Chernoguzov et al. | |
| 2010/0299187 A1 | 11/2010 | Duggal | |
| 2011/0246891 A1 | 10/2011 | Schubert et al. | |
| 2011/0295391 A1* | 12/2011 | Schneider .......... G05B 19/0426 700/87 |
| 2012/0311526 A1 | 12/2012 | DeAnna et al. | |
| 2013/0201316 A1 | 8/2013 | Binder et al. | |
| 2013/0275560 A1 | 10/2013 | Bestmann et al. | |
| 2014/0101581 A1 | 4/2014 | Lan et al. | |
| 2014/0372963 A1 | 12/2014 | Chandaria et al. | |
| 2014/0372975 A1 | 12/2014 | Chandaria et al. | |
| 2015/0045960 A1 | 2/2015 | Caron et al. | |
| 2015/0127192 A1 | 5/2015 | Phatak et al. | |
| 2015/0199088 A1 | 7/2015 | Chandaria et al. | |
| 2015/0286362 A1 | 10/2015 | Chandaria et al. | |
| 2015/0331406 A1 | 11/2015 | Wang | |
| 2016/0092064 A1 | 3/2016 | Wu | |
| 2016/0327925 A1 | 11/2016 | Leonelli et al. | |
| 2016/0357526 A1 | 12/2016 | Soffer et al. | |
| 2018/0165070 A1* | 6/2018 | Khambay ............... G06F 9/541 |

FOREIGN PATENT DOCUMENTS

| | | |
|---|---|---|
| CN | 101373441 A | 2/2009 |
| CN | 101438299 A | 5/2009 |
| CN | 102177501 A | 9/2011 |
| CN | 102262557 A | 11/2011 |
| CN | 102271153 A | 12/2011 |
| CN | 102479079 A | 5/2012 |
| CN | 102999322 A | 3/2013 |
| EP | 3092561 A1 | 11/2016 |
| JP | 2006216048 A | 8/2006 |
| JP | 2008021095 A | 1/2008 |
| JP | 2010539600 A | 12/2010 |
| JP | 2011150430 A | 8/2011 |
| JP | 2016112651 A | 6/2016 |
| KR | 20080044576 A | 5/2008 |
| WO | WO-2005050503 A1 | 6/2005 |
| WO | WO-2013/058768 A1 | 4/2013 |
| WO | WO-2014/041623 A1 | 3/2014 |
| WO | WO-2014204989 A1 | 12/2014 |
| WO | WO-2017/027632 A1 | 2/2017 |

OTHER PUBLICATIONS

Extended European Search Report dated Oct. 23, 2017 for Application No. 15735508.2.
International Search Report and Written Opinion dated Apr. 22, 2019 for PCT Application No. PCT/US18/63704.
Kreger, Heather, "Web Services Conceptual Architecture (WSCA 1.0)," Internet Citation, May 2001.
Haruyoshi Maruyama, "How to Use Device Driver Configurator," Interface, CQ Publishing Co., Ltd., vol. 33, No. 6, Jun. 1, 2007, pp. 57-70.
Singapore Written Opinion dated Jun. 11, 2018 for Application No. 11201708743U.
International Search Report and Written Opinion dated Jun. 15, 2018 for PCT Application No. PCT/US2018/022359.
Japanese Office Action dated Jun. 18, 2018 for Application No. 2016-521515.
Japanese Office Action dated Jun. 18, 2018 for Application No. 2016-521516.
Japanese Office Action dated Jun. 18, 2018 for Application No. 2016-521518.
Chinese Office Action dated Jun. 21, 2018 for Application No. 201480038517.8.
International Search Report and Written Opinion dated Nov. 24, 2017 for PCT Application No. PCT/US2017/047964.
PCT International Search Report and Written Opinion on application No. PCT/US2019/055109 dated Jan. 22, 2020.

* cited by examiner

METHOD AND APPARATUS FOR CREATING AND MANAGING CONTROLLER BASED REMOTE SOLUTIONS

CROSS-REFERENCE TO RELATED APPLICATIONS

The present application claims benefit of U.S. Provisional Application Ser. No. 62/377,963 filed on Aug. 22, 2016, and is a continuation-in-part of co-pending U.S. application Ser. No. 15/386,180 filed on Dec. 21, 2016, each of which is herein incorporated by reference in their entireties.

BACKGROUND OF THE INVENTION

Field of the Invention

Embodiments of the present invention generally relate to a method and apparatus for creating and managing controller based remote solutions.

Description of the Related Art

The use of field programmable gate arrays (FPGAs) and other controller devices (e.g. microcontroller or microprocessor based), such as MCU, SoC, mobile phones, computers, etc. have grown considerably popular. Low manufacturing costs, availability, and customization of controllers have led to a proliferation of microcontrollers and Systems on a Chip (SoC) (e.g., PIC, ARDUINO, RASPBERRY PI and the like) being used by commercial companies and hobbyists alike for creation of devices. Controller devices include a processor core and a memory, which are programmable for processing input/output data in communication with peripherals. Program memory in the form of NOR FLASH or OTP ROM is also often included on such controller devices, as well as a small amount of random access memory (RAM). Several such controller devices are designed for embedded applications within larger devices.

Real world applications of such controller devices can potentially include connecting controller devices with conventional objects or systems as peripherals, thereby enabling digitization, connectivity and even remote control of such peripherals. However, several challenges exist in making such real world applications accessible to average users, particularly those with limited or no programming and hardware knowledge.

Configuring the peripherals (conventional objects or systems) for use with controller devices is, in general, quite complex. Further, in several applications of controller devices, ability to accommodate dynamic inputs and/or generate dynamic output, may be desirable. Configuring and programming controller devices to accommodate dynamic inputs or outputs requires writing or rewriting the code for all controller devices, and is very challenging for average users because one needs to understand hierarchies of the peripherals and suitable controller devices for the peripherals, memorize coding commands, utilize proper calling syntaxes, and the like. In the absence of accurate code, a program will fail to run or produce errors. Further, rewriting programs every time a modification in input or output is required, can be cumbersome and excessively time consuming.

As the "Internet of Things (IoT)" grows, more and more such controller devices are connected to one another and/or to the Internet. Groups of such devices may communicate with one another and/or to a gateway such that the gateway becomes a proxy for the Internet communications for the so-called edge devices. The edge devices may communicate through one or more gateways, or directly as independent devices. Within a group, all the devices (gateway and edge) must be programmed in a compatible manner to facilitate interoperability. Managing compatibility every time customization is required may also be excessively time consuming.

Thus, there is a need in the art for creating and managing controller based remote solutions.

SUMMARY OF THE INVENTION

Embodiments of the present invention generally relate to a method and apparatus for creating and managing controller based remote solutions, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 8-10 depict GUIs used to create remote solutions in accordance with an embodiment of the invention; and FIGS. 11-15 depict GUIs used to manage remote solutions in accordance with an embodiment of the invention.

DETAILED DESCRIPTION

Figure 1:
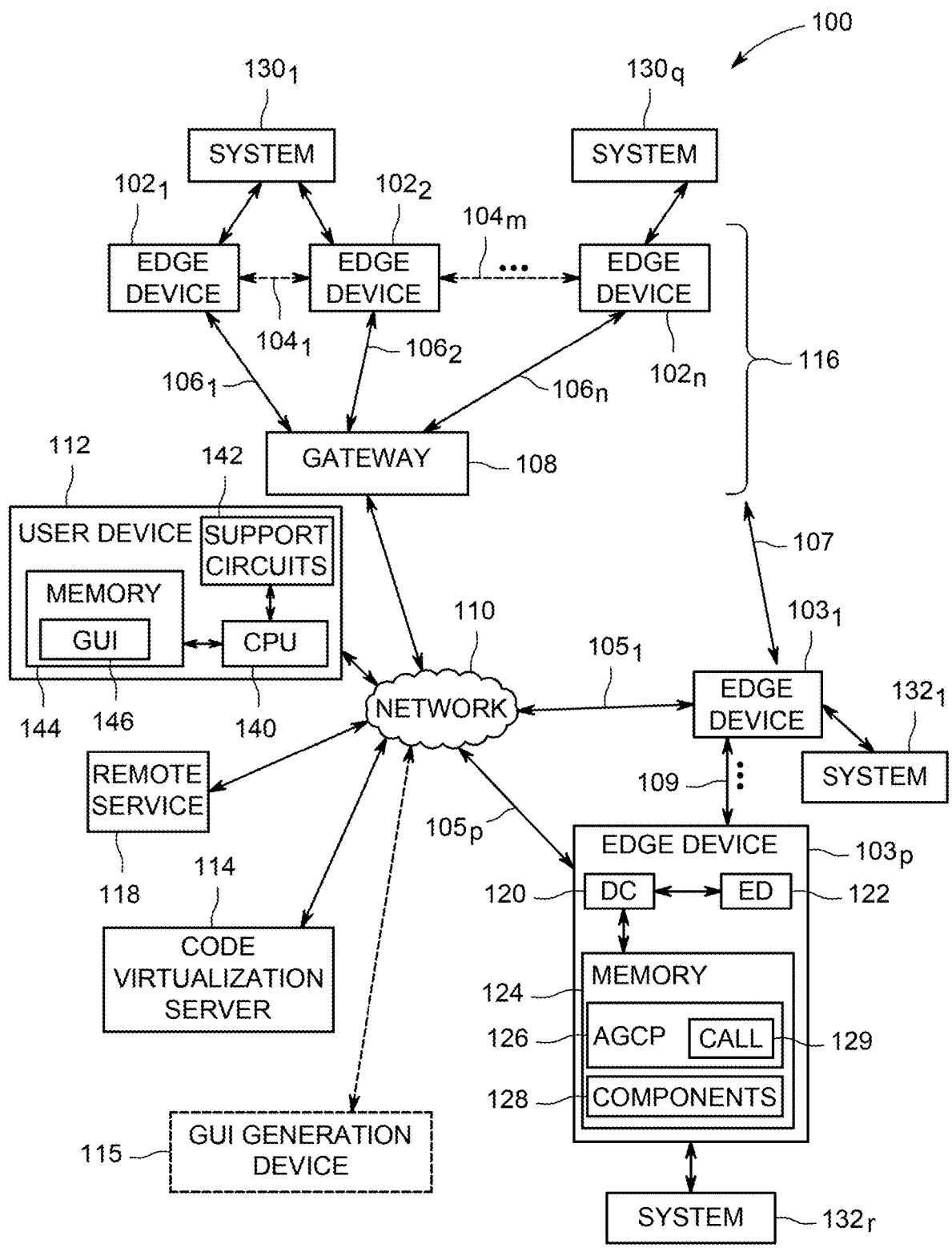
FIG. 1 is block diagram of an apparatus for creating and managing a controller based remote solution, in accordance with an embodiment of the invention.

Embodiments of the present invention relate to method and apparatus for creating and managing controller based remote solutions. More specifically, a method and apparatus is provided to create, deploy, and manage remote solutions incorporating controller devices (e.g., devices having a controller, such as microcontrollers, microprocessors, SoC, MCU, among others) in conventional systems (e.g. a water tank, a refrigerator and the like), both of which are typically remote from a user, using a remote graphical interface. Embodiments of the present invention, using a graphical user interface (GUI) to enable a user to build a solution comprising a controller device installed in a conventional system. In some embodiments though, pre-defined solution templates comprising controller device(s) and predefined conventional solutions may also be presented to the user for selection of the predefined solutions, and/or modification to 'customize' a predefined solution.

The GUI further enables a user to identify necessary hardware components of the solution such as controller devices, and program the hardware components, including placing remote calls to a virtualization server. The hardware components may be programmed to perform functions within the conventional system based on a condition associated with a parameter of the designed solution, such as a particular value of the parameter being reached. For example, in a cold storage room, temperature is a monitored parameter, and if the temperature exceeds a predefined threshold value, a function is performed. The function may be increasing cooling, for example, by adjusting air conditioning vents appropriately, or by turning on additional air conditioning equipment. Similarly, the remote calls may be placed based on the same or different conditions of the parameter. The remote calls enable the solution hardware to perform various functions that the solution hardware would otherwise be incapable of performing. For example, temperature sensors coupled to low power controller devices, such as MCUs, SoCs, FPGAs among several others, may not have sufficient processing power to implement different functions, such as, assessing the situation, or to initiate adjustment of air vents, turning on additional air conditioning equipment, sending notification over a communications network. Consequently, a low cost solution can be implemented to perform sophisticated functions.

Further embodiments of the invention enable generation and presentation of monitored data of the conventional system (e.g. water level in the water tank, temperature in a particular compartment of the refrigerator, lumens in a given region or volume) via GUIs for monitoring and controlling solutions. The GUI for monitoring and controlling solutions may be the same as, or different from, the GUIs for building the solutions. The GUIs for monitoring and controlling solutions further enable receiving inputs to modify one or more solution parameters via the GUI, modifying the condition associated with the parameter, and modifying the programming of the solution hardware. The presentation of monitored data, receiving inputs, and modification of programming may be implemented in real-time, for example, using the GUIs for monitoring and controlling solutions on a mobile user device. The GUIs for monitoring and controlling solutions may be generated and/or implemented on a different device than the GUIs for building a solution.

Commonly assigned patent application Ser. No. 11/853,137, filed 11 Sep. 2007; Ser. No. 11/853,143, filed 11 Sep. 2007; Ser. No. 12/931,292, filed 28 Jan. 2011 (now U.S. Pat. No. 8,726,285); Ser. No. 14/307,198, filed 17 Jun. 2014; Ser. Nos. 14/307,227; 14/307,208, filed 17 Jun. 2014; Ser. No. 14/593,151, filed 9 Jan. 2015; Ser. No. 14/685,064, filed 13 Apr. 2015; Ser. No. 15/063,764, filed 8 Mar. 2016; and Ser. No. 15/148,353, filed 6 May 2016, each of which is incorporated herein by reference in their entireties, describe techniques for developing software for a controller device incorporating a controller, mapping the use of hardware such as sensors or actuators to the controller remotely using a graphical user interface, and executing the software, e.g. remotely, to extend the capabilities of such a controller device via defined workflows.

A snippet of code and/or a library is placed in the memory of the controller device. The snippet, when executed, sends a call for being executed on a code virtualization server, and/or sends (directly or via the code virtualization server) data to a service provider, and/or further calls a function to be remotely performed on the data by the service provider. Embodiments of the present invention use placement of snippets of code to create, and manage (i.e. monitor and control) controller based remote solutions comprising at least one controller device coupled to a conventional remote system. With such embodiments, remote solutions can be created for dynamic environments, for example, conventional systems coupled to controller devices. Other embodiments enable changing the code, the inputs for the code, changing the outputs required, configuring additional electronic devices (e.g., sensors, actuators, and the like) for use with the controller devices, or changing the configuration of the solutions. The configuration of the solutions may be changed by the controller devices, the conventional system, or a user using a user computer remote to the code virtualization server (or a "coding server") on which the code is created and may be executed in part.

Embodiments of the invention utilize a graphical user interface (GUI) on a user device, such as a user computer, to access the functionality on a code virtualization server (CVS). The CVS comprises a code or a snippet generator and a software developer kit (SDK) generator, which enable a user in creating a program or a process for a controller device associated with a conventional system. Using the GUI, the user selects a blank template for generating a solution or a pre-defined solution, for example, solutions stored in a library, such as a solution for a water tank, a refrigerator, and the like, identifies relevant controller device(s) (that is, the hardware required for operationalizing the solution), and provides or selects input with respect to the parameters for the controller device(s), the conventional system, and the process requirements of the programmed functionality. As used herein, pre-defined solution includes a blank solution template in which the user selects one or more controller device(s) and defines a conventional system and association of controller device(s) thereto. Therefore, the user can build a controller-device based solution completely from scratch using the embodiments described herein. While the embodiments discussed herein refer to pre-defined solutions, the techniques can be applied to build solutions from a blank template. All references to a pre-defined solution or a pre-defined conventional system includes a reference to a 'blank' solution template in which the controller device(s), conventional system and the entire solution is definable via a user input.

The inputs received on the GUI on the user device, are used by the code virtualization server to create a program for the controller device(s), in a language suitable for the controller device(s) and according to the processing power of the controller device(s). The program or process generated automatically based on the predefined inputs by a user may also be referred to as a predefined device program or an automatically generated controller program (AGCP). The AGCP generally includes an automatically generated, pre-defined (based on user input) program code, and associated profile which includes parameters (data inputs) for executing the predefined program code, connection profiles, connection parameters, protocols, and other operational information required for execution of the predefined code.

The code virtualization server may abstract part of the process (program code required to provide a functionality) that may be too resource intensive or 'heavy' for the controller device to execute, and replace such abstract portion of the process, or abstracted code, with a remote call in the AGCP to such abstracted code accessible via a network. The abstracted code is executed by another computer that is remote to the controller device, for example, another remote computer or the code virtualization server itself, which is capable of executing the 'heavy' code. Upon executing the abstracted code, the remote computer returns the execution back to the controller device along with any data (e.g. an output) associated with the execution of the abstracted code, if applicable. The abstracted code may further include accessing a remote service, e.g. a service provided by a device other than the controller device, the user device or the code virtualization server, thereby greatly enhancing the functionality afforded by the controller device(s), and significantly reducing the costs associated with enabling such functionalities. For the sake of simplicity, the abstracted code is further described as a program being stored and executed on the code virtualization server, however it is understood, that the abstracted code may be stored or executed on another device remote to the user device, the code virtualization server and the controller devices. According to some embodiments, the abstracted code is a program on the code virtualization server, and referred to as code virtualization server program (CVSP).

According to embodiments of the present invention, the AGCP is created, deployed and managed for configuring or reconfiguring controller based remote solutions. Conventional techniques require designing complex configurations for each solution, creating code for every controller device required for a solution, modifying such code every time a new input needs to be processed by a process or a different output is desired. Embodiments of the present invention enable selecting the desired solution, selecting the required or available hardware, automatically generating AGCP for each controller device, and deploying the AGCP code to the controller devices.

In some embodiments, one or more parameters of the conventional solution are monitored, and the monitored data is displayed graphically within the GUI on the user device. In some embodiments, one or more parameters for the controller device(s), the conventional system, and the process requirements, for example, selected by the user are displayed along with and relation to the monitored data. In some embodiments, the monitored graphical data is displayed in real time, and in some embodiments, the monitored graphical data is displayed upon request received from the user, for example, via the GUI on the user device.

In some embodiments, the GUI provides inputs for modifying the code, modifying the input or output for the code, modifying the hardware configuration, or modifying the solution (e.g. parameters, conditions) in response to the presented graphical data. In some embodiments, the solution is analyzed to determine an additional conventional system parameter that may be modified, and the GUI presents an additional parameter, which may be modified by the user by manipulating the GUI. In some embodiments the GUI for presenting monitored data, and for modifying one or more parameters, conditions, analyzing solutions as discussed above, are different from the GUIs using which a solution is built, and such GUIs are implemented on a second server (not shown) other than the code virtualization server. The second server is communicably coupled to the controller devices of the solution, and the second server updates the solution using the modifications received via the GUIs, thereby controlling the solution according to such modifications.

In some embodiments, the second server, comprising the GUIs for monitoring and controlling solutions, may be implemented on the code virtualization server itself. For simplicity of discussion, embodiments described herein the second server implemented on the code virtualization server. Accordingly, in the embodiments described herein, the code virtualization server is illustrated as generating the GUIs for monitoring and controlling the solution. However, those skilled in the art will appreciate readily that the various functionalities of the code virtualization server depicted in the embodiments described herein can be implemented via two or more servers. Therefore, building a solution may be implemented on a first server, monitoring and controlling may be implemented on a second server, processing remote calls (i.e. code virtualization) may be implemented on a third server, so on and so forth. All such servers will be communicably coupled to the elements of the apparatus (e.g. controller devices 102, 103, 108), user device 112, remote service 118 as needed, and all such implementations using multiple servers are contemplated herein.

In the described following embodiments, a "process" or a "program" or AGCP shall refer to a ready-to-run code base or predefined program code that is already deployed on an execution controller device or a computer (e.g., server, personal computer, mobile device, etc.). Each process is uniquely identified to the user by name, process ID, icon, or other identifier to the user. "Execution" shall refer to the launch of a process on a controller device or a computer (local or remote or Cloud based). A "bundle" shall refer to a collection of processes organized by a common attribute (API name, common parameters, SDK, parameter names, remote server, and the like). Examples discussed herein are not limiting in scope, but rather distinguishing specific embodiments for explanatory purposes.

The AGCP expands the functionality of the external controllers in the electronic devices by executing remote process calls to a coding server (or a code virtualization server), or a group of servers, or a remote service. The controller device comprises at least one controller coupled with a memory (for storing code), and with electronic devices comprised in the controller device. In some embodiments, electronic devices (e.g. sensors, actuators) do not form a part of the controller device, rather, the electronic devices are coupled to the elements of a conventional system. Some embodiments of the controller device include programmable sub-systems such as ARDUINO, TEXAS INSTRUMENTS LAUNCHPAD, FREESCALE BOARDS KINETIS, ST MICROELECTRONICS STM32, INTEL EDISON, and the like. The controller device may also be a System on a Chip (SoC) such as a RASPBERRY PI and the like. Some embodiments of controller devices include programmed controllers of other assembled devices and systems such as NEST THERMOSTAT, PHILIPPS HUE, BELKIN, WITHINGS, and the like.

The code virtualization server is capable of performing a heavier processing load to execute more resource intensive or intricate programs that the controller device is incapable of performing due to hardware and/or software limitations, for example, low processor power, limited memory capacity, reduced operating system functionality, lack of instruction sets, limited connectivity capability, and the like. The code virtualization server may also execute commands to authenticate and access additional third party databases and services (e.g., AMAZON, EBAY, FACEBOOK, APPLE PUSH NOTIFICATION servers, text message servers, email servers, and the like), or an internal data source (e.g., DB, NoSQL DB, files and the like), also referred to as remote services. Advantageously, a user may modify the profile to access different accounts associated with a remote service, thereby, changing the AGCP without having to re-create the AGCP code.

Code for a controller device is generated automatically. For example, an AGCP is generated by the code virtualization server. Alternatively, the code may be provided by a controller manufacturer, or the like. Code configuration, testing, execution and management is implemented via a graphical user interface (GUI) on a user device, remote to the controller device for which the code is written. The profile associated with the code may be modified via the same GUI or another remote graphical user interface. In some embodiments, the process calls made from a controller device are directed to processes residing on a code virtualization server, which is remote to the controller device and the user device having the GUI. The predefined program code or the AGCP stored on the controller device may comprise multiple such process calls, and programming components generally used to support in making such calls. The process calls and associated profiles (including data for variables required to execute the process calls) are communicated to the code virtualization server that executes, in response to the calls, the called processes. In some embodiments, the called processes are code virtualization server programs (CVSPs) using the associated profiles stored locally on the code virtualization server, or received from the user device. In some embodiments, the CVSP is a part of a process library on the code virtualization server. In some embodiments, after executing the calls using the CVSP code, the code virtualization server returns data resulting from executing the calls back to the controller device for further processing. The resultant data is sent in a format native to the controller device type, enabling the controller device to process such data further, for example, by executing the AGCP stored on the controller device. The code virtualization server either generates the resultant data in the native format of the controller device type, or converts the resultant data to the native format of the controller device type, using known techniques. In other embodiments, resultant data is not required by the controller device to continue its operation, and in such embodiments, the code virtualization server simply sends an indication or a confirmation that execution of the CVSP code (or abstracted code), executed in response to a call from the AGCP, is completed.

As an example, a water tank system in a residential rainwater harvesting application may contain a pump for controlling the supply to and from the water supply grid. If the water level in the tank is sufficient (i.e., above a pre-defined threshold value), additional water from the grid is not needed. However, if the water level is below the threshold level, the pump must provide additional water from the grid. Operations to control the supply are implemented via sensors and actuators (or electronic devices) working in conjunction with the water tank, the grid, and the pump(s) installed therein. In order to create a remote, controller-based management solution to activate the pump based on the water level, a user needs to design appropriate hardware configurations, configure the hardware with the correct connections and programs, and supply the correct parameters for execution of the programs. The burden of designing, configuring and operationalizing a remote solution for a simple conventional system described above can be quite complex and overwhelming for most users. Embodiments described herein remedy this complexity by providing a GUI on the user device. The GUI communicates with the code virtualization server (CVS), and presents solution templates stored at the code virtualization server to the user for selecting a desired solution. In other embodiments, the GUI allows for designing a solution from scratch.

In this particular example, the user selects a water tank solution. In some embodiments, a solution closest to a water tank is selected if a water tank solution is not available, or a solution is suggested to the user based on responses provided by the user in the GUI, to certain queries (e.g. stored at the code virtualization server) posed to the user in the GUI. In exemplary embodiments, the water tank solution can actuate a pump or the grid water supply based on the water level in the tank.

Upon selecting the water tank solution the GUI presents the user with a desired configuration of the water tank solution. For example, the water tank solution comprises, apart from the water tank and the pump, a water level sensor to indicate the level of water in the water tank, an actuator to control the pump, the actuator functionalities including start, stop, and speed variations. The water tank solution further includes communication devices for establishing wireless or wired connections between the water level sensor, the pump, the actuator, the network, and optionally, a gateway device. If installed, the gateway device interfaces with the network on one side, and the water level sensor and the pump actuator on the other. Each of the controller devices comprises electronic devices (e.g. sensors, actuators incorporated in the controller device), or the controller device is coupled to electronic devices of a conventional system, or a combination thereof. For ease of explanation, embodiments describe controller devices comprising the electronic devices, however, it is understood that in some embodiments, the electronic devices form a part of the conventional system, and are communicably coupled to the controller devices. In some embodiments, the GUI allows a user to specify connection(s) between the conventional system and the controller device graphically. For example, users can specify the output of a sensor to map to the desired pin on the controller device, or specify the parameter monitored by the sensor. The user can further provide specific values of the parameter (e.g., temperature or light intensity) to function as a condition for triggering a remote call of the AGCP from the controller device, or as boundaries on a visualization of monitored data. The controller devices including the electronic devices described above define a minimum hardware required for the remote water tank solution. In some embodiments, the code virtualization server determines the minimum hardware required based on a library of solutions, hardware and processes. The GUI presents the minimum hardware requirement to the user. For example, the GUI may present an interactive set of questions to the user to determine the solution required, and identify the required devices, such as controllers, sensors, actuators, and the like, and the user may use this information to obtain the required hardware and complete the required configuration for the solution, for example, as suggested in the GUI.

If the minimum hardware requirement is not complete, the user is prompted to install the minimum required hardware, for example, as presented in the GUI. Once the user confirms via the GUI that such hardware requirement is complete, the code virtualization server generates a program (referred to as a process, predefined program/code, or AGCP) for all the controller devices in the water tank solution. The user also has the opportunity to test and modify the code using the GUI. Thereafter, the user deploys the code to the controller devices using the GUI. If needed, the user manages the devices and the associated code using the GUI, for example, to add controller devices, features, changing operating conditions or parameters, among others, to the remote solution configuration. Such modifications may also be received in response presenting monitored data of the conventional system (e.g. a graph of water level of the water tank over time) on the GUI of the user device. In some embodiments, the code virtualization server monitors, via the controller devices (and electronic devices), data relating to one or more parameters of the conventional system. The code virtualization server sends, as GUI information, the monitored data for being displayed in the GUI of the user device. The GUI information includes one or more parameters of the solution in relation to the monitored data. For example, the GUI information includes information for displaying a graph of water level in the water tank over time, color-coding the graph using boundary parameters specified by the user, and the condition (water level) at which the pump is configured to be actuated, and/or at which a remote call is made by the controller device.

In some embodiments, remote calls from the controller device are made for interacting with one or more remote services, such as FACEBOOK, TWITTER, AMAZON, data storage service, and the like. These calls can be implemented as a call directly from the controller device to the remote services, or as a call to the CVSP code, which in turn interacts with the remote services and provides the data to the controller device for further execution of the AGCP code.

Embodiments of the invention are thus capable of designing, deploying and modifying such remote solutions, which include one or more controller devices installed in conjunction with conventional systems, using a GUI on a user device.

FIG. 1 is an overview diagram of a system 100 for creating and managing controller based remote solutions, for example, for conventional systems 130 ($130_1$, ... $130_q$) or systems 132 ($132_1$, ... $132_r$), in accordance with one or more embodiments of the present invention. The system 100 comprises multiple controller devices or edge devices $102_1$, $102_2$, ... $102_n$ (collectively referred to as edge devices 102) connected to the conventional systems 130 (in one-to-one, one-to-many, or many-to-one configuration). The system 100 also comprises multiple controller devices or edge devices $103_1$, ... $103_p$ (collectively referred to as edge devices 103) connected to the conventional systems 132 (in one-to-one, one-to-many, or many-to-one configuration). The system 100 further comprises a gateway 108, which is also a controller device, a network 110, a user device 112 or a user computer 112, a code virtualization server 114 or a coding server 114, an optional GUI generation device 115, and a remote service 118. In the following discussion, the edge devices 102, 103 and the gateway 108 are collectively referred to as controller devices.

The edge devices 102 and the gateway 108 form a group of devices (or device group 116) connected to the network 110. In the device group 116, the gateway 108 communicates internally with edge devices 102 along communications paths $106_1$, $106_2$, ... $106_n$, and externally with the network 110. Although the communications paths are generally wireless paths, in some embodiments, the paths may be wired. Also, in some embodiments, the edge devices 102 communicate amongst themselves along dashed paths $104_1$, $104_2$, ... $104_n$, or along direct paths (not shown) to all or some other edge devices 102. The edge devices 103 communicate directly with the network 110, and amongst themselves along dashed path 109, and in some embodiments, each edge device 103 can communicate with another edge device 103. Although a single gateway 108 is depicted, multiple gateways may be used within the group 116, or spanning multiple groups similar to the device group 116. Each edge device 102, each edge device 103, and the gateway 108 is a controller device (or incorporates one), that can be programmed either remotely or through direct connection from the user computer 112. In some embodiments, controller of each of the edge devices 102, the edge devices 103 and the gateway 108 can be programmed by the code virtualization server 114.

Each device (edge devices 102, 103, and the gateway 108) includes a device controller (DC), electronic devices (ED), and a memory. In some embodiments, electronic devices are included within the conventional system, for example, water level sensors that are built-in with the tank. In other embodiments, the electronic devices are provided separately in the apparatus 100, or as a part of the controller devices 102, 103 or 108. For simplicity of discussion, various embodiments describe electronic devices as a part of the controller devices 102, 103, or the gateway 108, however, it will be understood that the electronic devices may be a part of the conventional systems 130 or 132, and communicably coupled to the controller devices 102, 103 or 108. Further, for example, and for the sake of brevity, only the edge device $103_{1-p}$ is shown to include the device controller 120, electronic devices 122 and a memory 124, although each device (edge devices 102, 103 and the gateway 108) includes these components. The device controller 120 may be a microcontroller (e.g., PIC, AVR type, ARM type, and the like) or a SoC (e.g., RASPBERRY PI), or a microprocessor as generally known in the art. The type of controller may differ from device to device, for example, based on the application of such device and the functionality required. The electronic devices 122 include, but are not limited to, sensors, lights, audio speakers, actuators, displays, printers, scanners, I/O devices and the like. The electronic devices 122 comprise components to manage a conventional system, such as the systems 131, 132. The memory 124 may be any form of digital storage used for storing data and executable software. Such memory includes, but is not limited to, random access memory, read only memory, disk storage, optical storage, and the like. In some embodiments, the memory 124 stores computer readable instructions corresponding to an operating system (not shown). The memory 124 further stores an automatically generated controller program (AGCP) 126 or a program incorporating an automatically generated code snippet, a call 129, for example, a call to a function to be executed on a remote server such as the code virtualization server 114, and other code components 128, including program libraries, necessary for executing the code including the AGCP 126 and the call 129. According to some embodiments, the AGCP 126 is received from the code virtualization server 114 and installed in the memory 124. The components 128 are also capable of ensuring that an edge device can communicate to the code virtualization server 114 via a gateway 108 and that the gateway 108 is capable of allowing such communications. As shown in FIG. 1, in some embodiments, the call 129 is included in the AGCP 126.

The user device 112 comprises a CPU 140, support circuits 142 and a memory 144. The CPU 140 processes inputs and outputs to the devices. The CPU 140 may be any commercially available processor, microprocessor, microcontroller, and the like. The support circuits 142 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, or other user interaction mechanism. The memory 144 may be any form of digital storage used for storing data and executable software. Such memory includes, but is not limited to, random access memory, read only memory, disk storage, optical storage, and the like. The memory 144 stores computer readable instructions corresponding to an operating system (not shown) and a graphical user interface (GUI) 146. The user device 112 is coupled to the network 110 when designing, deploying or managing a remote controller device based solution for conventional system 130 and/or 132. In one embodiment, the user computer 112 is also coupled to the code virtualization server 114 via the network 110 during automatic program generation. The GUI 146 retrieves a list of pre-defined operations that may be performed by the code virtualization server 114, including the details of functionalities, hardware, conventional systems, and solutions. In some embodiments, the GUI 146 is a software resident on the code virtualization server, rendered on the user device via a browser.

In some embodiments, the GUI 146 includes an integrated development environment (IDE) for creating programs for the controller devices. The GUI 146 also facilitates selection of a desired remote solution for a given convention system (131, 132), presentation of the hardware (edge devices 102, 103, gateway 108) required for a selected remote solution, selection and/or validation of the installed hardware, creating programs (AGCP) for the hardware, e.g. edge devices and/or the gateway automatically via the code virtualization server 114, and testing and deploying the programs to the edge devices 102, 103 and/or the gateways 108. The programs executed on the edge devices make a remote call for executing a process (e.g., a remote program) on device remote to the edge devices and/or the gateway, e.g. the code virtualization server, or interfacing with a remote service. Using the GUI, the user thereby designs, creates, tests, and operationalizes the controller based remote solution, and further manages the remote solution thus created. In some embodiments, there may be multiple code virtualization servers, for example, each server associated with a different set of devices, or each server assigned to execute a different set of function calls, among other organization schemes. In some embodiments, the AGCP may be tested over virtualized controller devices, and the testing may be conducted before or after sending the AGCP to the controller devices.

The code virtualization server 114 stores various reference libraries, application program interfaces (APIs), and software development kits (SDKs), and code generating software, to execute the offered operations selected using the GUI 146 of the user device 112. The code virtualization server 114 generates, based on input from the GUI 146, an automatically generated controller program (AGCP) for deploying on each of the controllers of the edge device 102, 103 and the gateway 108. The AGCP includes remote process calls to processes on the code virtualization server 114, or for interacting with a remote service 118. In some embodiments, the code virtualization server 114 stores profile data, such as user accounts, login credentials, and other data to execute remote process calls in the AGCP stored on the controller devices. The code virtualization server 114 also deploys AGCP on controller devices, e.g. edge devices 102, 103 or the gateway 108, based on an authorization received from the GUI 146. The authorization includes verification of login credentials supplied via the GUI 146 to enable deployment of the AGCP on the controller devices. In some embodiments, libraries include a list of solutions, required hardware, processes, conventional systems, and a list of pre-defined operations or functionalities.

The remote service 118 includes private or public services provided by third party servers or databases. For example, the remote service 118 includes third party databases and services (e.g., AMAZON, EBAY, FACEBOOK, APPLE PUSH NOTIFICATION servers, text message servers, email servers, and the like), or an internal data source (e.g., DB, noSQL DB, files and the like). The remote service 118 is accessible to the code virtualization server 114 via the network 110 or another network.

The network 110 comprises the Internet, or a wide area network (WAN) or a combination, and may include one or more such networks. All the components of the system 100 are communicably coupled to the network 110 or to each other as illustrated in FIG. 1, using known methods and components.

Figure 2:
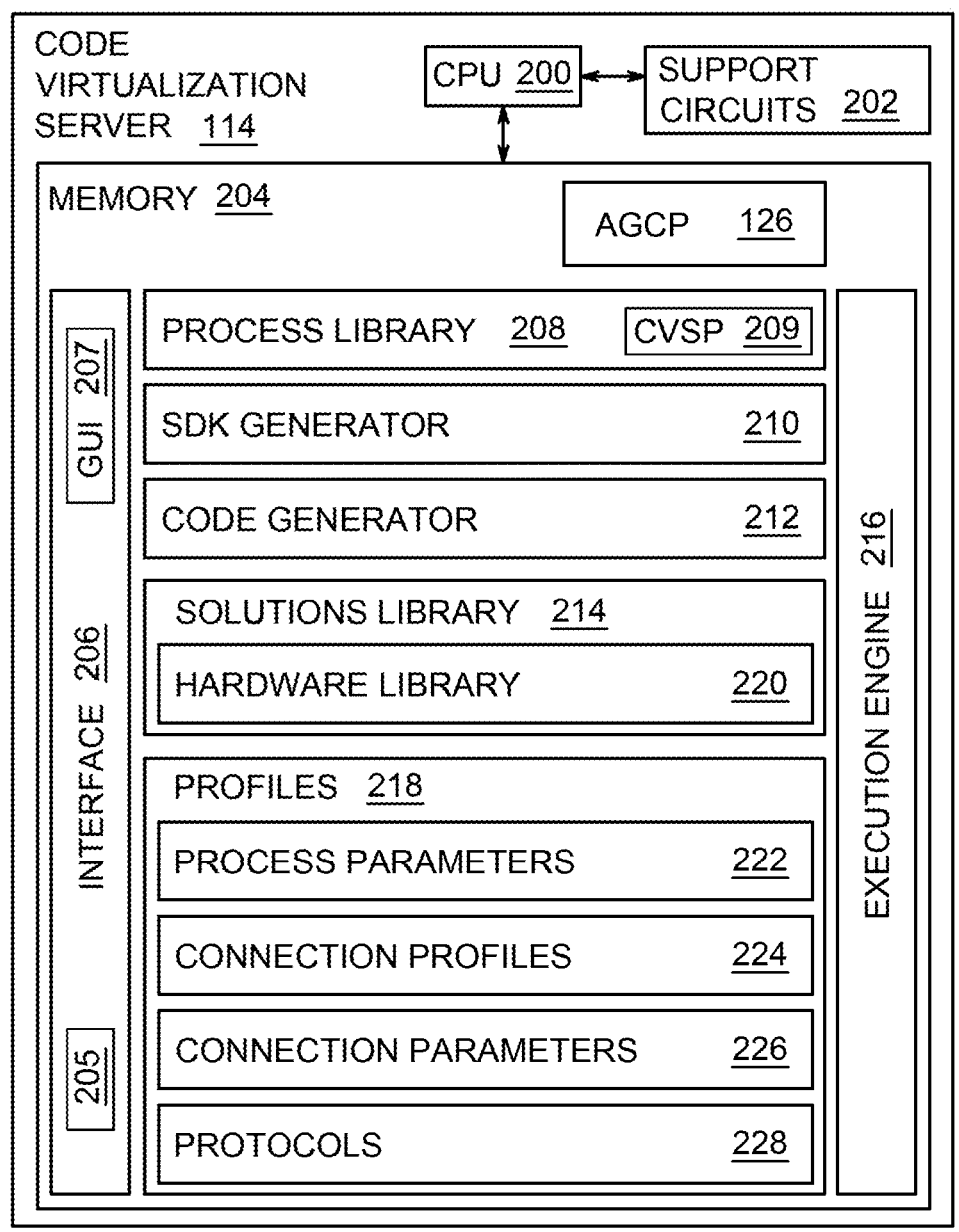
FIG. 2 is a block diagram of a code virtualization server of FIG. 1, in accordance with an embodiment of the invention.

FIG. 2 depicts a block diagram of the code virtualization server 114 in accordance with one embodiment of the invention. The code virtualization server 114 may be a general-purpose computer or other electronic processing device that is programmed to be a specific purpose computer to perform functions related to embodiments of the present invention. The code virtualization server 114 comprises a CPU 200, support circuits 202, and memory 204 containing instructions and algorithms. The CPU 200 processes inputs and outputs to/from the devices. The CPU 200 may be any commercially available processor, microprocessor, microcontroller, and the like. The support circuits 202 comprise well known circuits that provide functionality to the CPU such as a user interface, clock circuits, network communications, cache, power supplies, I/O circuits, and the like. Alternative embodiments may use control algorithms on a custom Application Specific Integrated Circuit (ASIC). In some embodiments, the user interface comprises a keypad, electronic buttons, speaker, touchscreen, display, or other user interaction mechanism. The memory 204 may be any form of digital storage used for storing data and executable software. Such memory includes, but is not limited to, random access memory, read only memory, disk storage, optical storage, and the like. The memory stores computer readable instructions corresponding to an operating system (not shown), an interface 206, a process library 208, an SDK generator 210, a code generator 212, a solutions library 214, an execution engine 216, and a profile 218. In some embodiments, the interface 206 comprises a GUI generation module 205 to produce GUIs 207, and/or a portal containing the GUIs 207, which are sent to the user computer 112 for presentation to a user. In some embodiments, the GUI generating module 209 is implemented on the GUI generation device 115 remote to the CVS, the user device, and the controller device. The user, using one or more GUIs presented on the user computer 112 interacts with the code virtualization server 114 to provide inputs and program the controller devices.

The process library 208 comprises programs or code corresponding to functions selected by a user using the GUI 146, to enable certain functions for the controller devices, also referred to as code virtualization server programs (CVSPs). The functions are enabled by the controller devices making a call to CVSPs in the process library 208, for example, CVSP 209. Each function is also referred to as a "choreograph" or "choreo." The CVSP 209, when called by a controller device, causes execution of the CVSP 209 via the execution engine 216 at the code virtualization server 114. The CVSP 209 performs certain functions that the controller devices would otherwise not be able to perform. The CVSP 209 may further include code or programs for executing the remote service 118 (for example, AMAZON, FACEBOOK, TWITTER, among others) on a device remote to the code virtualization server 114, the user device 112 and the controller devices 102, 103 or 108.

The process library 208 also includes all processes applicable to the conventional system. For example, the process library 208 includes a process (program or code) for changing the state of the actuator based on a monitored state of the conventional system. For example, in the water tank solution example, such processes include a process to turn off the supply from the grid if the water level in the water tank is above a predefined level, a process to turn on the grid supply of the water level in the tank is below a predefined level, and the like.

The SDK generator 210 generates an SDK in response to a user interacting with the GUI 146 and selecting or defining the choreos to be implemented in connection with the controller devices. The SDK is included in the components 128 of the edge devices 102, 103 or the gateway 108, and supports the execution of the AGCP 126.

The code generator 212 creates a complete program code, or snippets of code for insertion in a complete program code, in response to the functions or choreos selected by the user for a particular controller device. Such code is referred to as automatically generated controller program (AGCP) 126, which may be stored in the memory 204, for being sent to the controller devices 102, 103 or 108. The AGCP 126 includes a call to the CVSP 209 on the code virtualization server 114, and the AGCP 126 is sent to the controller devices for execution thereon. The AGCP 126, when executed by the controller devices, calls the a program in the process library 208, according to the desired function configured in the AGCP 126, for example, the CVSP 209. In some embodiments, the code generator 212 generates a modified AGCP for deployment on the controller device based on inputs to modify a parameter or any other aspect of an AGCP via the GUI 146 on the user device 112.

The solutions library 214 includes pre-defined details about controller based solutions supported by the embodiments of the invention. The solutions library 214 includes details of the conventional systems (e.g. systems 131, 132 of FIG. 1) such as a water tank system, a refrigerator, a residential heating system, among several others. The details of conventional systems includes the various management components or electronic devices of such systems, including sensors, actuators, and the like, that can be used to monitor a parameter, or to modify or actuate a parameter of the conventional system. The solutions library 214 also comprises a hardware library 220, which comprises a list of controller devices available to interface with the management components of the conventional systems.

The solutions library 214 further includes language prompts and several other linguistic constructs, or questions, that incorporate the available solutions, sub-components of such solutions, hardware of the hardware library 220 to interact with a user. For example, the various language constructs or questions incorporating the solutions, sub-components therein, or the hardware may be used to prompt the user for appropriate inputs, such as that with respect to selecting the appropriate remote solution, or configuring the solution, or selecting and/or identifying hardware required.

Either the questions or language constructs for seeking input can be stored in one or more languages in the solutions library 214, or the solutions library 214 may incorporate a dynamic linguistic engine, such as those known in the art, to generate questions or language constructs in real time, or a combination thereof is employed. The objective is to present several, easy to comprehend language or questions to users to elicit inputs that are easy for the users to provide, thereby reducing or eliminating the complexity of code, components thereof, and technical jargon. Such questions or language constructs are communicated to be rendered via a GUI, for example, the GUI 146 on the user device 112. For example, the embodiments of FIGS. 8-12 illustrate several language constructs prompted via a GUI.

In the water tank solution example, the solutions library 214 contains the descriptor "water tank" and other synonyms to easily identify the available solution to the user, components of the water tank system, such as a water tank, a grid, a pump, associated pipes, a list of suitable controller devices, and electronic devices such as actuators for the pump, water level sensors, and the like. The hardware library 220 includes a list of controller devices compatible with the electronic devices, such as actuators and water level sensors, and all parameters pertaining to the controller device and the electronic devices. The parameters include the states of the actuator (pump "OFF", operational at "LOW SPEED", operational at "HIGH SPEED", the parameter monitored (for example, water level), states of the water level (for example, in inches, or "HIGH", "MEDIUM", "LOW"). In some embodiments, the controller devices and the electronic devices may be manufactured as a single composite device, and the hardware library 220 also includes a list of such composite devices.

The process library 208, the solutions library 214 and the hardware library 220, together also referred to as "reference libraries," form an exhaustive pool of the available solutions for conventional systems, components of such conventional systems, controller devices (or hardware) required to interface with such conventional systems, all the processes required to operate the controller devices, and all the parameters thereof. Each of the process library 208, the solutions library 214 and the hardware library 220 may be updated to add, remove or edit the available solutions. Such updates can be used to enhance the functionalities available to the controller device based remote solutions, without requiring an upgrade to the controller devices themselves.

Profiles 218 comprise data to execute one or more programs, and controlling the output of such programs. At least one of the profiles 218 corresponds to at least one process of the process library 208. The profile 218 comprises process parameters 222 including a list of process parameters, connection profiles 224, connection parameters 226, and protocols 228 relating to the at least one process. In some embodiments, the process parameters 222 include a condition relating to an operational parameter of the conventional system. For example, based on the condition being met, a remote call (e.g. the call 129 of the AGCP 126) is placed from the controller devices 102, 103 or 108 to the CVSP 209. In the water tank example, if the condition is set as the water level reaching a state "HIGH," at which the supply from the grid is turned off. Further, process parameters 222 include user data such user names, identification information and passwords such that code virtualization is performed in a secure environment.

Examples of parameters included in the profile 218 are illustrated, without limitation, in Table 1.

TABLE 1

| Type | Parameter | Example/Comments |
|---|---|---|
| General | Profile name | Name of a set of parameters (includes all sub-profiles) |
| Hardware Profile | Hardware type | Arduino Uno, Arduino Yun, , Texas Instruments CC3200, Raspberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a webservice like Facebook, . . . |
| Credential Profile | Password | Password for a webservice like Facebook, . . . |
| Credential Profile | API Key | Developer API key given by webservices like Facebook, . . . There can be several API keys |
| Credential Profile | API Secret | Developer API secret given by webservices like Facebook, . . . There can be several API secrets |
| Connection Profile | Connection Profile name | Allows to select different Connection profiles |
| Connection Profile | Type | Wifi, Bluetooth, Zigbee, Z-WAVE, THREAD, LORA, 6LOWPAN, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, TCP/IP . . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be mutiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

The profile 218 is set up according to the desired behavior of the AGCP 126, and in turn the called CVSP 209 and/or the remote service. According to some embodiments of the present invention, the profile 218 is modified, e.g. by a remote user, to control the behavior of the AGCP code, without modifying the code itself. In other embodiments, the AGCP code may be modified according to the desired code behavior.

The execution engine 216 supports all the foregoing functions, for example, by executing CVSPs corresponding to the choreos called by controller devices 112, and further executing a remote service 118 on a device remote to the user device 112, the code virtualization server 114 and the controller devices 102, 103 or 108, facilitating interoperability between the various components of the system 100. The execution engine 216 utilizes each of the functional blocks described above to enable a user to program controller devices to control and modify, via a GUI on the user device, extended functionality through the code virtualization server 114 and the remote service 118.

For simplicity of discussion, embodiments described herein show that the code virtualization server 114 generates the GUIs for monitoring and controlling the solution. In some embodiments, as discussed above, the GUIs for monitoring and controlling the solutions are implemented on an independent device (e.g. the GUI generation device 115), which is different from and remote to, the code virtualization server. Such an independent device is a computing device similar to the CVS, for example. As also discussed above, any one or more of the several functionalities of the code virtualization server 114 described herein can be implemented via two or more devices remote to the code virtualization server, as will occur readily to those of ordinary skill, and all such implementations are contemplated herein.

Figure 3:
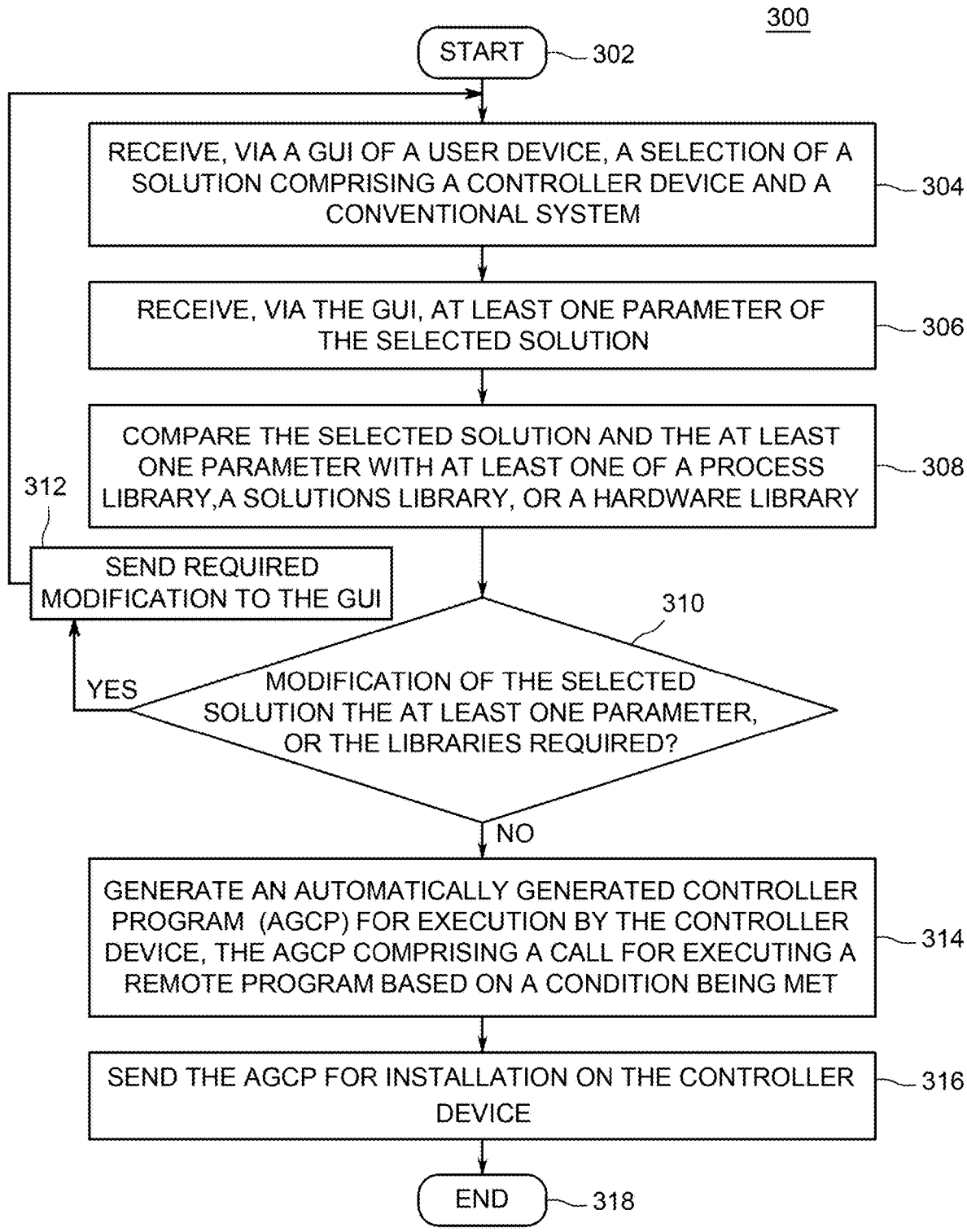
FIG. 3 is a flow diagram of a method for creating and managing remote solutions as executed by the code virtualization server of FIG. 1, in accordance with an embodiment of the invention.

FIG. 3 depicts a flow diagram of a method 300 executed by the code virtualization server 114 for creating and managing controller based remote solution, in accordance with embodiments of the present invention. In some embodiments, the method 300 is executed in response to manipulation of a GUI, for example, the GUI 146 of the user device 112, interacting with the interface 206 of the code virtualization server 114. In some embodiments, the GUI 146 is the GUI 207 implemented via a network browser, such as INTERNET EXPLORER, GOOGLE CHROME, MOZILLA FIREFOX, for example, on the user device.

The method 300 begins at step 302 and proceeds to step 304, at which the method 300 receives a selection of a desired solution from the GUI on the user device. The desired solution may include a predefined solution comprising one or more predefined controller device(s), conventional system element(s) and connectivity configuration(s). The desired solution may also include defining the solution from scratch, that is a blank template, in which the user selects or otherwise defines one or more of controller device(s), conventional system element(s) and connectivity configuration(s). The desired solution may also include the user selecting predefined solutions and modifying the configuration related to one or more of the predefined controller device(s), conventional system element(s) and connectivity configuration(s), thereby building a 'customized' solution. The following discussion relates to all of the above, viz., a pre-defined solution, a customized solution or a user-defined solution built from a blank template. For example, a user inputs a desired solution via the GUI 146, by selecting a solution from a list of solutions displayed in the GUI 146. The list of solutions in the GUI is populated using the solutions library 214. In alternate embodiments, the user may interact with the GUI 146 to search for a solution in the solutions library 214 using keywords, and thereafter select one of the available or suggested solutions. For example, the user may select a water tank solution from a drop down list, or by searching for terms such as "water tank," "tank," "pool," and the like, which displays the water tank solution in the GUI 146, which is selected by the user. The solution includes at least one controller device, for example, one of the controller devices 102, 103 or 108, and a conventional system, for example, one of the conventional systems 130 or 132. For example, the user selects the controller device $103_p$ and the conventional system $132_r$.

The method 300 proceeds to step 306, at which the method 300 receives at least one parameter from the GUI. For example, the user manipulates the GUI 146 on the user device 112 to specify one or more parameters, which is captured by the GUI 146, and sent from the user device 112 to the code virtualization server 114. The one or more parameters include a monitored parameter of the conventional system, for example, as monitored by a sensor, a condition for the monitored parameter, for example, a specific value or values of the monitored parameter, and a remote program parameter for executing a remote program. The remote program is, for example, the program for being executed remote to the controller devices and the user device, in response to a call from the controller device, based on the condition being met. The remote program parameter comprises an identification of the remote program (or the choreo), and other parameters to execute the remote program. According to some embodiments, the remote program is the code virtualization server program (CVSP) 209.

The method 300 proceeds to optional sequence of steps denoted by the numeral 309 comprising steps 308, 310 and 312. In some embodiments, the method 300 proceeds from step 306 directly to step 314 without implementing the optional sequence of steps 309. The embodiments in which the optional sequence of steps 309 is implemented, the method 300 proceeds to step 308, at which the method 300 compares the input received at steps 304 and 306, comprising the selected solution and the at least one parameter, with at least one of the process library 208, the solutions library 214 or the hardware library 220. The method 300 checks if the solution selection received at step 304, is compatible with the solutions in the solutions library 214 and the hardware library 220, and the at least one parameter received at step 306 is compatible with the processes in the process library 208. For example, the method 300 compares if the controller device or the conventional system specified by the user at step 302 with the controller devices or the conventional systems in the solutions library 214 or the associated hardware library 220. Similarly, the method 300 compares the at least one parameter specified by the user at step 306 with the corresponding parameters of the processes in the process library 208 or the profile 218.

The method 300 proceeds to step 310, at which an assessment is made whether a modification n of the selected solution, the at least one parameter or the libraries is required. For example, if the comparison at step 308 yields that the specific solution (controller device and/or conventional solution) selected or input by the user is not included in the solutions library 214, it is determined that a modification of the selected solution is needed. Similarly, if the at least one parameter received from the user is not included in the process library 208 or the profile 218, it is determined that a modification of the selected solution is needed. Further, in some embodiments, upon determining that one of the selected solution or the at least one parameter is not included in the solutions library 214 or the process library 208, respectively, the method 300 may determine that an update to the libraries is required, for example, based on a user prompt to update the libraries to include the desired solutions or parameters. In this manner, if at step 310, the method 300 determines that a modification is required, the method 300 proceeds to step 312, at which the method 300 sends the required modification(s) to the GUI 146 of the user device 112 for being presented to the user. The user may initiate an update of the libraries (208, 214) on the code virtualization server 114, or may modify the selected solution and/or the associated parameters, and restart the method 300 from step 302.

If at step 310, the method 300 determines that a modification is not required, the method 300 proceeds to step 314, at which the method 300 generates a program for being executed on the controller, for example, the automatically generated controller program (AGCP) 126, using the code generator 212. The AGCP 26 includes a call, for example, the call 129 for executing a remote program, for example, the CVSP 209 on the code virtualization server 114. Generating the program includes generating the AGCP, and an SDK, created by the SDK generator 210 to work in conjunction with the AGCP 126. In some embodiments, the SDK is a custom SDK and limited to supporting the functionality required by the AGCP, thereby reducing the size of the SDK. The method 300 proceeds to step 316, at which the AGCP is sent, for example, using the interface 206, to the controller device 112 for installation on the controller device 112. In some embodiments, the SDK is also sent to the controller device 112, using the interface 206. The method 300 proceeds to step 318, at which the method 300 ends.

Figure 4:
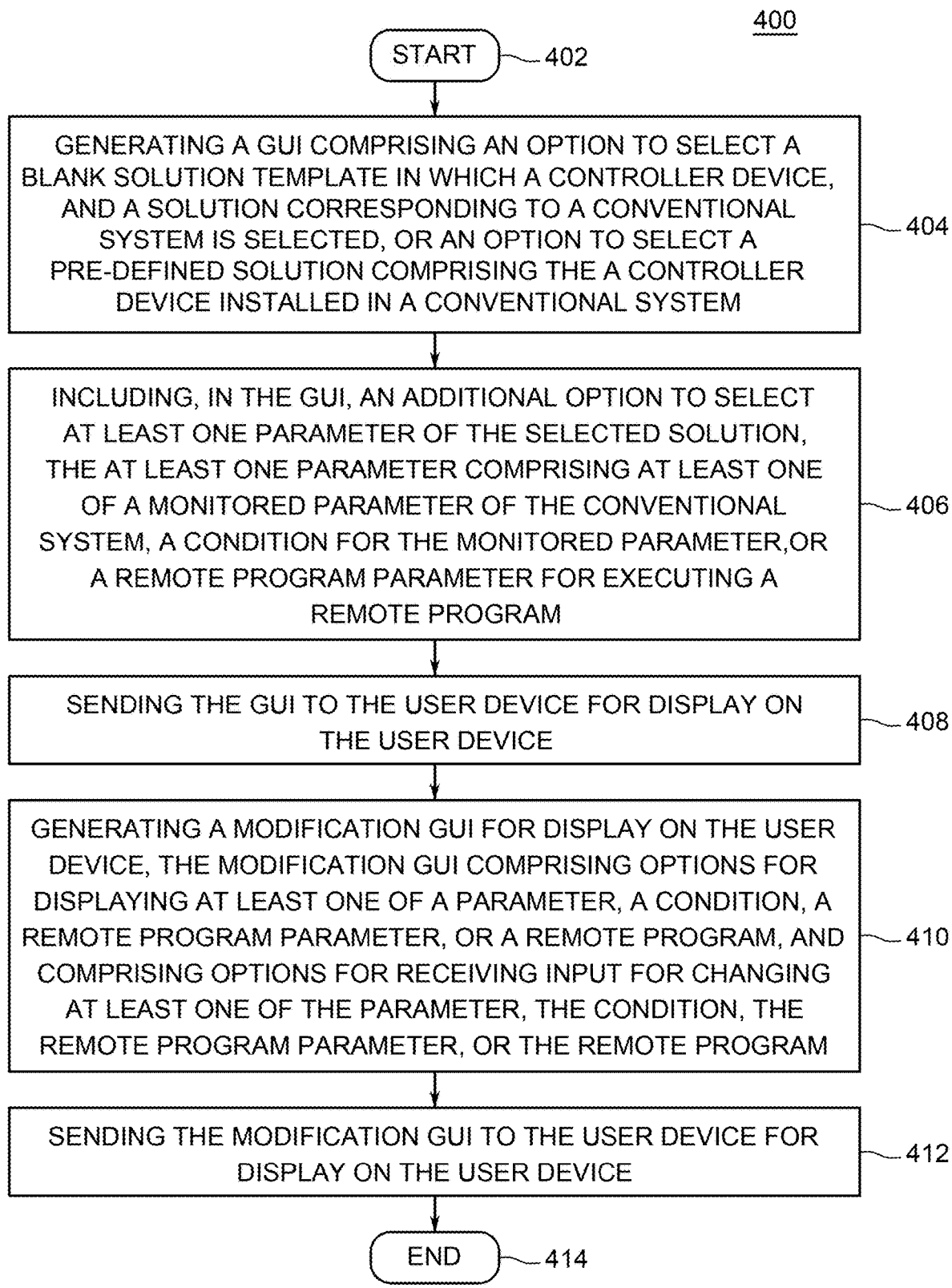
FIG. 4 is a flow diagram of a method for creating and managing remote solutions as executed by the code virtualization server of FIG. 1, in accordance with an embodiment of the invention.

FIG. 4 depicts a flow diagram of a method 400 for monitoring and controlling controller based remote solution, in accordance with embodiments of the present invention. As discussed above, the method 400 is implemented by the GUI generation module 205 on the CVS, or on an independent device, such as the GUI generation device 115, different from the code virtualization server 114. The GUI generation device 115 is communicably coupled at least to the controller devices (102, 103 and 108), or the user device 112, and may further be coupled to other components of the apparatus 100 in a manner similar to the code virtualization server 114.

The method 400 starts at step 402, and proceeds to step 404, at which the method 400 generates a GUI for displaying graphically, the GUI comprising an option to select a blank solution template in which a controller device is selected, and a solution corresponding to a conventional system is selected. The GUI also comprises an option to select a pre-defined solution comprising a controller device installed in a conventional system. At step 406, the method 400 includes, in the GUI, an option to select at least one parameter of the selected solution in step 404, where the at least one parameter comprises a monitored parameter. The method 400 also includes an option to select a condition for the monitored parameter, and/or an option to select or input a parameter for a remote program to be executed remote to a controller device. In the water tank solution example, the water level is the monitored parameter, and the monitored data includes the water level over time. The GUI includes information for displaying the monitored data as a visual element, for example, as a graph of water level versus time. The boundary parameters are one or more value(s) of the monitored parameter, and boundary parameters define the boundary of the data presented for visualization, are used in the visualization of the monitored data. For example, the boundary parameters includes a minimum value and a maximum value of water level for safety of the equipment (also referred to as "safe bounds"). According to various embodiments, the GUI information includes information for displaying the monitored data within between the safe bounds in one visual scheme (e.g. a green color to indicate that the operation is normal), and for displaying the monitored data outside the safe bounds in a different visual scheme (e.g. red color indicating that the operation is unsafe). For simplicity, the at least one parameter comprises the boundary parameters.

The method 400 proceeds to step 408, at which the method 400 sends the GUI to the user device 112 for being displayed as the GUI 146 at the user device 112. According to some embodiments, the GUI is sent automatically, for example, upon receiving monitored data from the controller device and/or sensors monitoring the conventional system. According to some embodiments, the GUI is sent based on a request received from the user device, for example, in response to the user making a request for via the GUI 146.

The method 400 proceeds to step 410, at which the method 400 generates a modification GUI for display on the user device. The modification GUI includes options for displaying parameter data (e.g. from a sensor or an actuator), condition, remote program parameter, or a remote program for being executed upon being called from a controller device. The modification GUI also includes options for receiving input for changing the condition, the at least one parameter, the remote program parameter, or the remote program itself. The modification GUI enables a modification of one or more aspects of a solution designed for a conventional system, for example, using the GUI generated at steps 404 and/or 406. The modification GUI is not as such different from the GUI generated at step 404 and/or 406, and may even be a modified version of the GUI generated at steps 404 and/or 406.

The method 400 proceeds to step 412, at which the method 400 sends the modification GUI to the user device 112 for being displayed as the GUI 146 at the user device 112. According to some embodiments, the modification GUI is sent automatically, for example, upon receiving monitored data from the controller device and/or sensors monitoring the conventional system. According to some embodiments, the modification GUI is sent based on a request received from the user device, for example, in response to the user making a request via the GUI 146.

The method 400 proceeds to step 414, at which the method 400 ends.

The modification GUI implemented as the GUI 146 provides functionality in a manner similar to the GUI generated at step 404 and/or 406, and as discussed with respect to the method 300 of FIG. 3. For example, the GUI 146 (with the modification GUI) receives an input to modify the at least one parameter. For example, the user may interact, on the GUI 146, with the GUI information. The GUI information includes the at least one parameter to view the monitored data, the boundary parameters, and the at least one parameter, and upon reviewing the GUI information, the user may modify the at least one parameter using the GUI 146. The GUI 146 sends an input corresponding to the desired modification by the user, to the code virtualization server 114 that the at least one parameter has been modified.

Based on the input to modify the at least one parameter, the CVS generates a modified AGCP, or modifies a copy of the AGCP 126 stored on the CVS. For example, the modified AGCP is generated as a new program by executing the method 300 in manner similar as described earlier. If the modified AGCP is generated by modifying a copy of the AGCP 126, the method 300 changes relevant portions of the AGCP 126, according to the modified parameter input received at step 410, using similar techniques as described with respect to the method 300. The modified AGCP is sent to the controller device 112 for installation on the controller device 112, in a manner similar to that described with respect to step 316 of the method 300.

Figure 5:
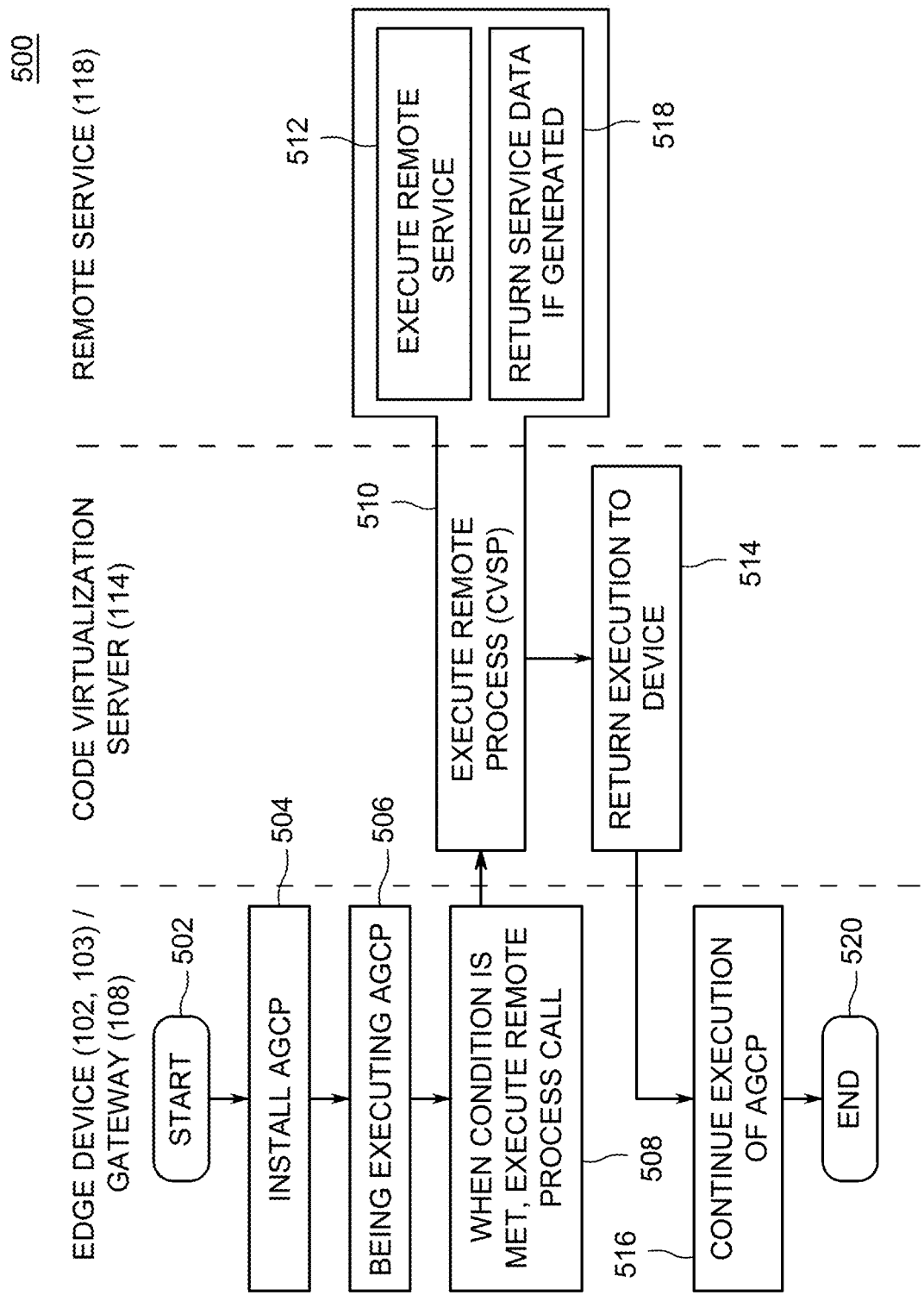
FIG. 5 is a flow diagram of a method for operation of a remote solution on a controller device, code virtualization server and remote service of FIG. 1, in accordance with an embodiment of the invention.

FIG. 5 is a flow diagram illustrating a method 500 for operation of a remote solution on a controller device (devices 102, 103 or the gateway 108), the code virtualization server 114, and a remote service 118, according to embodiments of the invention. The method 500 starts at step 502 on the controller device, and proceeds to step 504 at which the method 500 installs the AGCP 126 on the controller device. The AGCP 126 includes predefined program code or process associated with the controller device, and a corresponding SDK. The AGCP 126 includes a call to a remote device for executing a program corresponding to a functionality. For example, the call may be directed to the CVSP 209 on the code virtualization server 114. At step 506, the method 500 begins executing the AGCP 126 by the controller of the controller device, and at step 508, the method 500 upon determining that a condition for executing the remote call to the CVSP 209 is met, executes the remote call. The method 500 proceeds to step 510 at the code virtualization server 114, at which the CVSP 209 of the process library 208 is executed using the execution engine 216. The method 500 proceeds to step 514, at which the execution of the called process, the CVSP 209, and therefore, the remote call 129, is complete, and the execution of the method 500 is returned to the controller device. In some embodiments, the AGCP 126 and the remote call 129 is configured to execute the remote service 118, and in such embodiments, the step 510 further comprises steps 512, at which the method 500 shifts to the remote service 118, executed by a device remote to the controller devices, the code virtualization server and the user device. The method 500 executes the remote service at step 512, and proceeds to step 514, at which the method 500 returns service data, if generated by the execution of the remote service 118, to the step 510, and the method 500 proceeds to step 514. At step 516, the method 500 continues the execution of the AGCP on the controller device, through to completion. In some embodiments, the code execution may complete at the step 514 on the code virtualization server 114, and no additional execution of code may take place at steps 516. The method 500 proceeds to step 516, where the method 500 ends.

Figure 6:
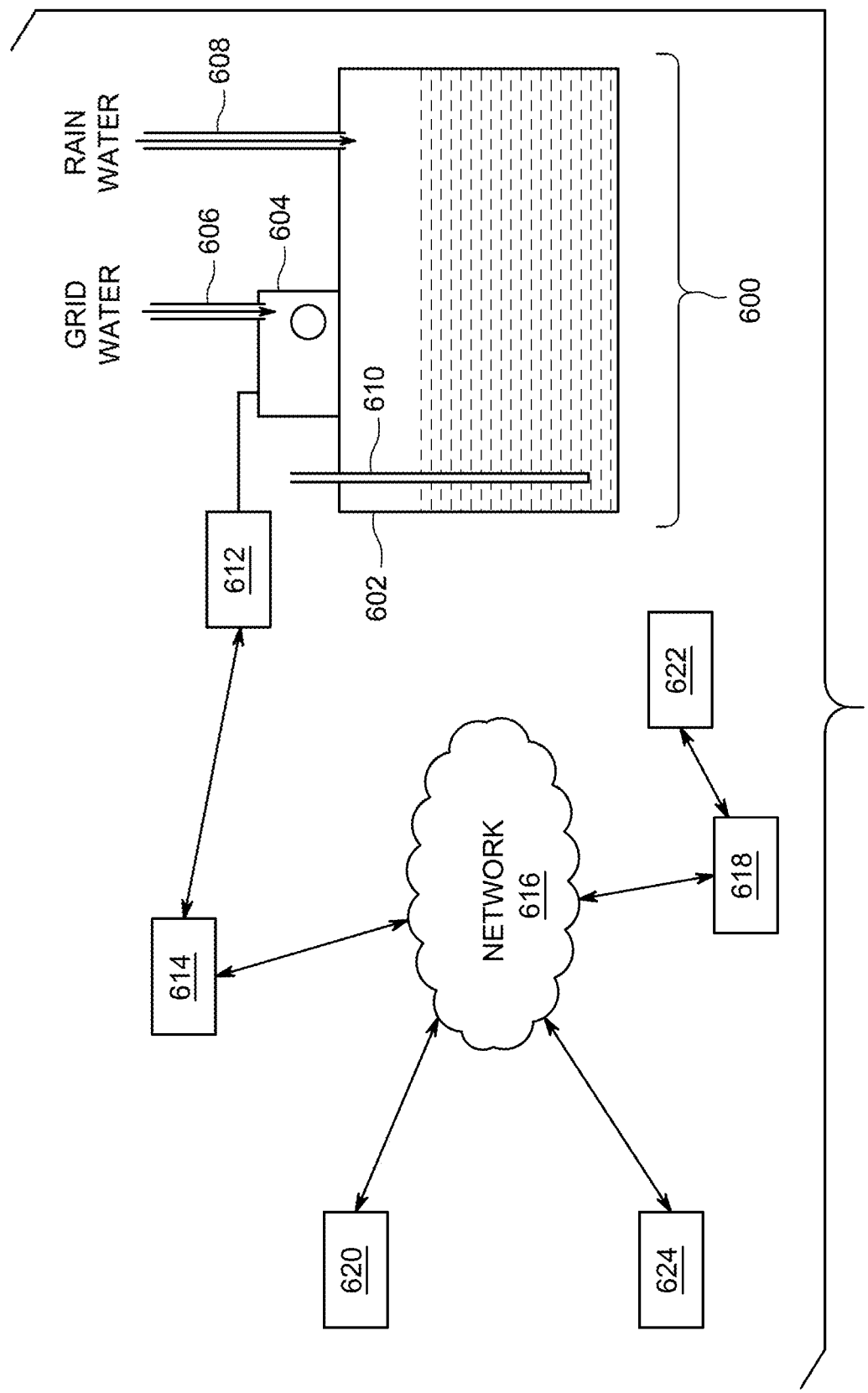
FIG. 6 depicts a water tank system, with a solution created and deployed remotely, and connected to the code virtualization server of FIG. 1 via a gateway, in accordance with an embodiment of the invention.

FIG. 6 depicts a conventional water tank system 600, with a solution created and deployed remotely, and connected to the code virtualization server of FIG. 1 via a gateway, in accordance with an embodiment of the invention. The conventional system 600 comprises a tank 602, a pump 604 coupled to a water grid 606, a rainwater harvesting supply 608, and a water level sensor. According to embodiments of the invention, the solution comprises an edge device 612, a gateway device 614, a network 616, a code virtualization server 618, and remote services 620, 622. The edge device 612 is communicably coupled, for example via wired or wireless means to the gateway device 614, for managing the conventional system 600 according to the solution configured by the user via a GUI on a user device (not shown), and implemented by the code virtualization server 618. Further, the communication connections between the edge device 612 and the components of the conventional system, for example, the pump 604 or the sensor 610 may be wired or wireless. Each of the gateway device 614 and the edge device 612 is a controller device configured with the AGCP and the SDK according to the method 300. The AGCP comprises a call to a device remote to the edge device 612 and the gateway device 614. The gateway device 614 is configured to route the calls from the edge device 612 appropriately via the network 616, which is similar to the network 110 of FIG. 1. The calls are typically made to the code virtualization server 618 comprising a process having the desired functionality according to the call in the AGCP. In some embodiments, the code virtualization server 618, and the remote services 620, 622 are communicably coupled to the gateway via a network 616. In some embodiments, the code virtualization server 618 is similar to the code virtualization server 114, and comprises a process library comprising the CVSP and the execution engine. In some embodiments, the call from the edge device 612 is made via the gateway 614, to the CVSP (not shown) on the code virtualization server 618, which executes the CVSP, and in turn executes the remote service 620, for example, a phone call service 620. In some embodiments, the call is made from the edge device 612 via the gateway 614 directly to the remote service 622, which is a weather forecast service 622. The phone call service 620 is used to notify the user or a plumbing company in case of an issue detected in the water tank, or upon a particular condition set by the user being met. For example, the user may specify, via parameters entered using the GUI of the user device, that if the water level in the tank 602 measured by the sensor 610 is low, the edge device 612 notifies the user by placing a call using the phone call service 620. Additionally, the edge device 612 is configured to actuate the pump 604 to supply water from the grid 606 to the tank 602. As another example, the weather forecast service 622 may be used by the remote solution as implemented by the embodiments of the invention, to delay using the grid water in case rain is anticipated. For example, the user may specify a condition, via parameters entered using the GUI of the user device, that if the weather prediction for the day is that it is likely to rain, and even if the water level in the tank 602 as measured by the sensor 610 is low, to not supply water from the grid 606 to the tank 602. According to some embodiments, the edge device 612 notifies the user that the water level is low but the grid water is not being supplied due to anticipated rains. Several similar applications of such services will occur readily to those skilled in the art without departing from the scope and spirit of the embodiments described herein, and defined by the claims.

Figure 7:
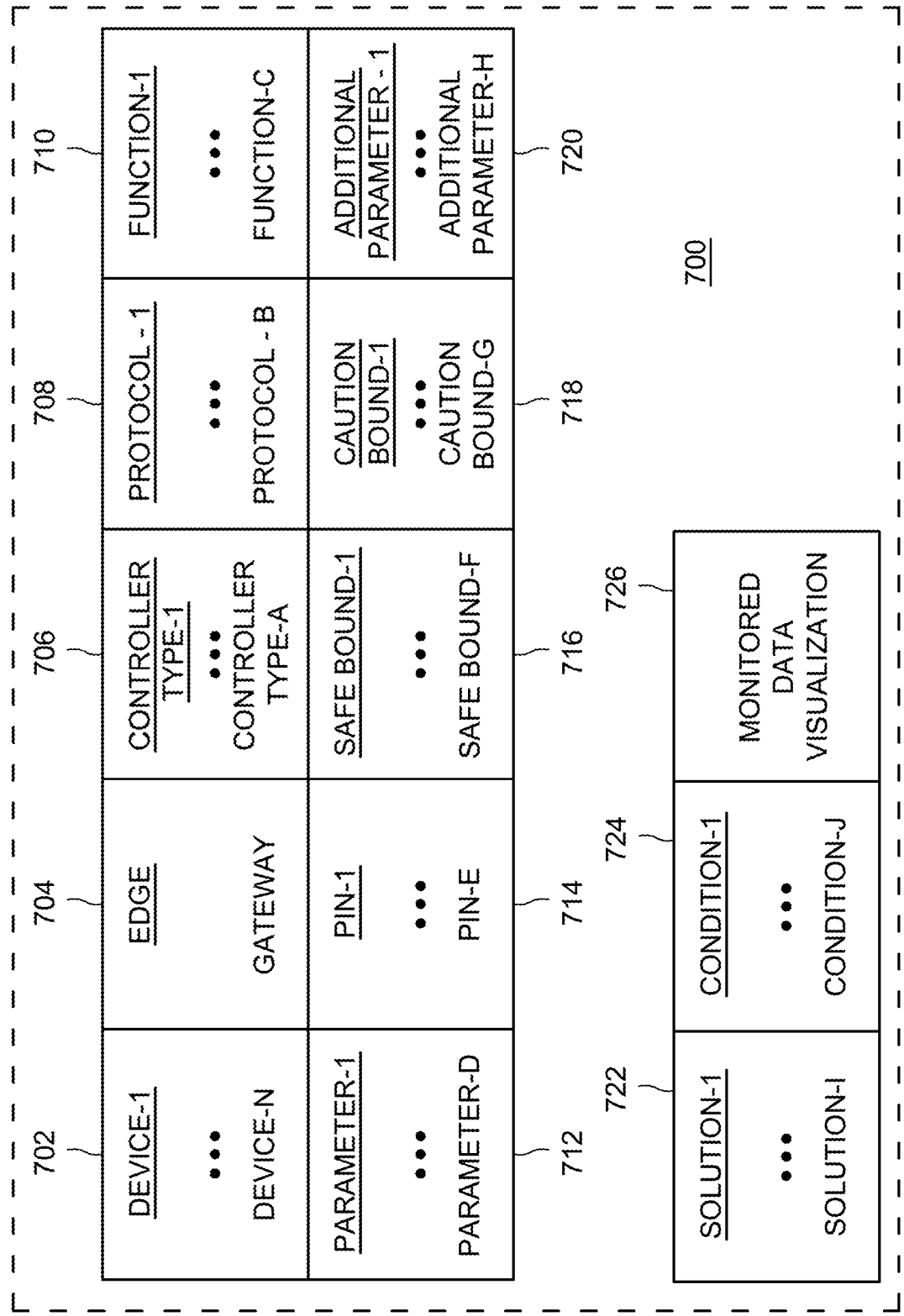
FIG. 7 depicts a schematic of a graphical user interface (GUI) of a user device of FIG. 1, in accordance with an embodiment of the invention.

FIG. 7 depicts a graphical user interface (GUI) 700 similar to the GUI 146 of FIG. 1, in accordance with an embodiment of the invention. The GUI 700 can take many forms, for example, as described below with respect to FIGS. 8-12, among several others that will occur readily to those skilled in the art. The GUI 700 presents, to a user of a user device on which the GUI 700 is displayed, various GUI elements 702-726 for receiving information graphically, for example, for consumption by the user, and for providing inputs corresponding to each of the GUI element 702-726, for example by user manipulation of the GUI elements 702-726. The GUI elements 702-726 include information relating to, and user input fields for configuring the desired solutions, parameters of the solution or components thereof, information relating to the monitored data of a parameter of the conventional solution. Specifically, the GUI 700 illustrates that the GUI element 702 relates to controller devices, for example, similar to controller devices 102, 103 or 108. In some embodiments, the GUI element 702 may be implemented as a drop down list for selection by the user, and the GUI element 702 illustrates that the device marked by underlining, DEVICE-1, is selected by the user from the list.

The GUI element 704 is for providing an input corresponding to whether the controller device is an edge device or a gateway device. The GUI element 706 relates to the controller type, for example, one of the controller types listed in TABLE 1. The GUI element 708 relates to communication protocols, for example, as listed in TABLE 1. The GUI element 710 relates to functions or choreos that need to be called from the controller device, for example, via the remote call 129 in the AGCP 126 for executing the CVSP 209. The GUI element 712 relates to one or more parameters of a selected solution or components thereof, including the parameters related to conventional systems. The GUI element 714 relates to selection of a pin on the controller of the controller device. The GUI elements 716 and 718 relate to boundary parameters, for example safe bounds for identifying safe operational limits for a monitored parameter, in the GUI element 716, and/or caution bounds for sending alerts when the monitored parameter is outside the caution bounds, in the GUI element 718. The GUI element 720 relates to any additional parameters of the selected solutions or conventional systems, for example, if two parameters selected in 712 are related. The GUI element 722 relates to controller based remote solutions, for example, as generated using the embodiments described herein. The GUI element 724 relates to a condition of the conventional system, which when met, triggers the execution of the remote call from the controller device to execute a function or a choreo at the code virtualization server. The GUI element 726 relates to visualization of monitored data of a parameter of the conventional system.

The GUI elements 702-726 may be implemented as a drop down list, a check list, an icon list, radio buttons, a data input form for entering alphanumeric characters, among several others as known in the art. The GUI element 726 may further present data graphically, for example as line charts, area charts, scatter diagrams, pie charts, bar charts, among several other graphical representations of data known in the art. While only the GUI element 726 is illustrated as presenting visualization data, other GUI elements 702-724 may also present visualization data corresponding to the relevant fields presented therein.

Figure 8:
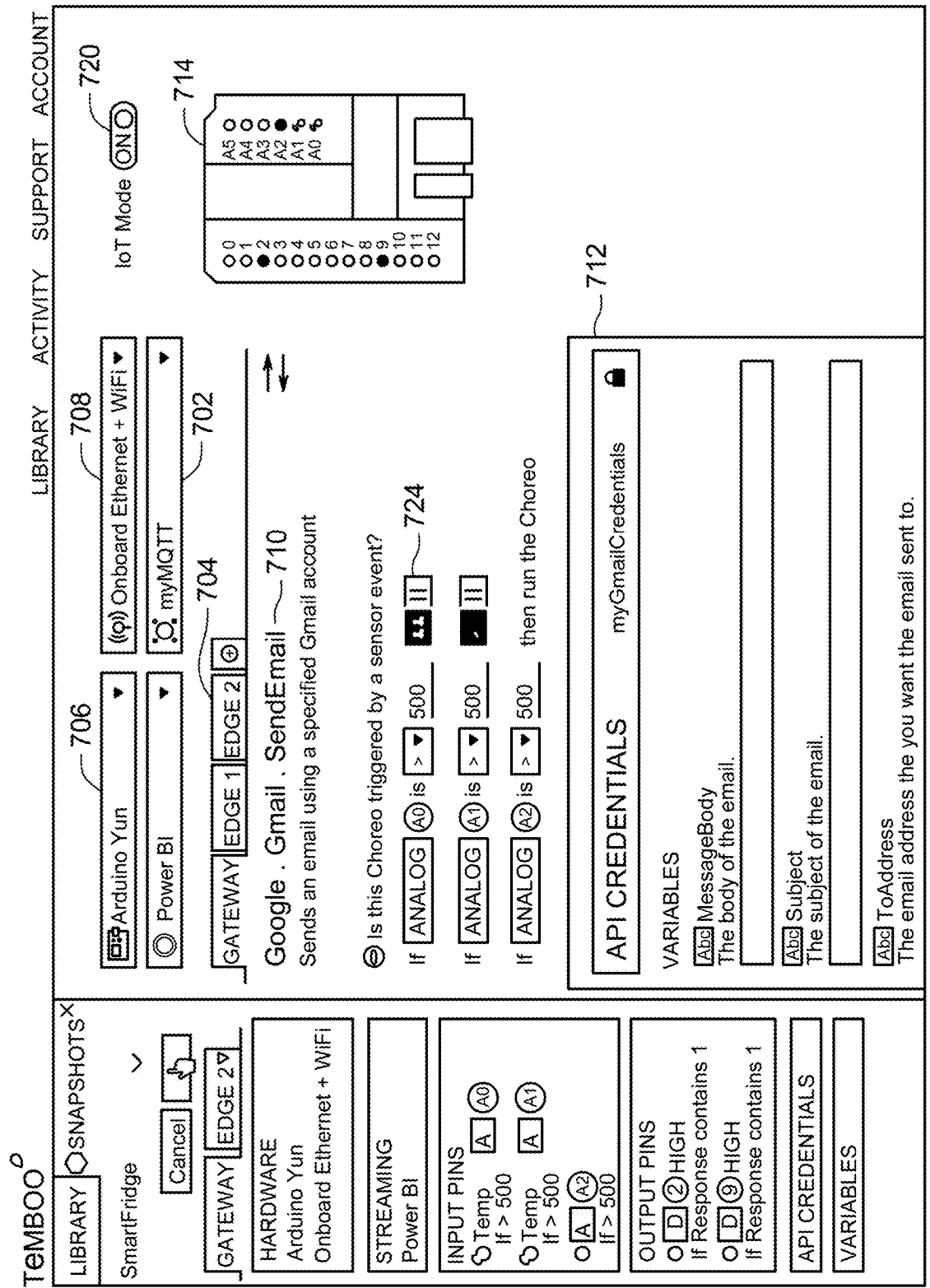
Figure 9:
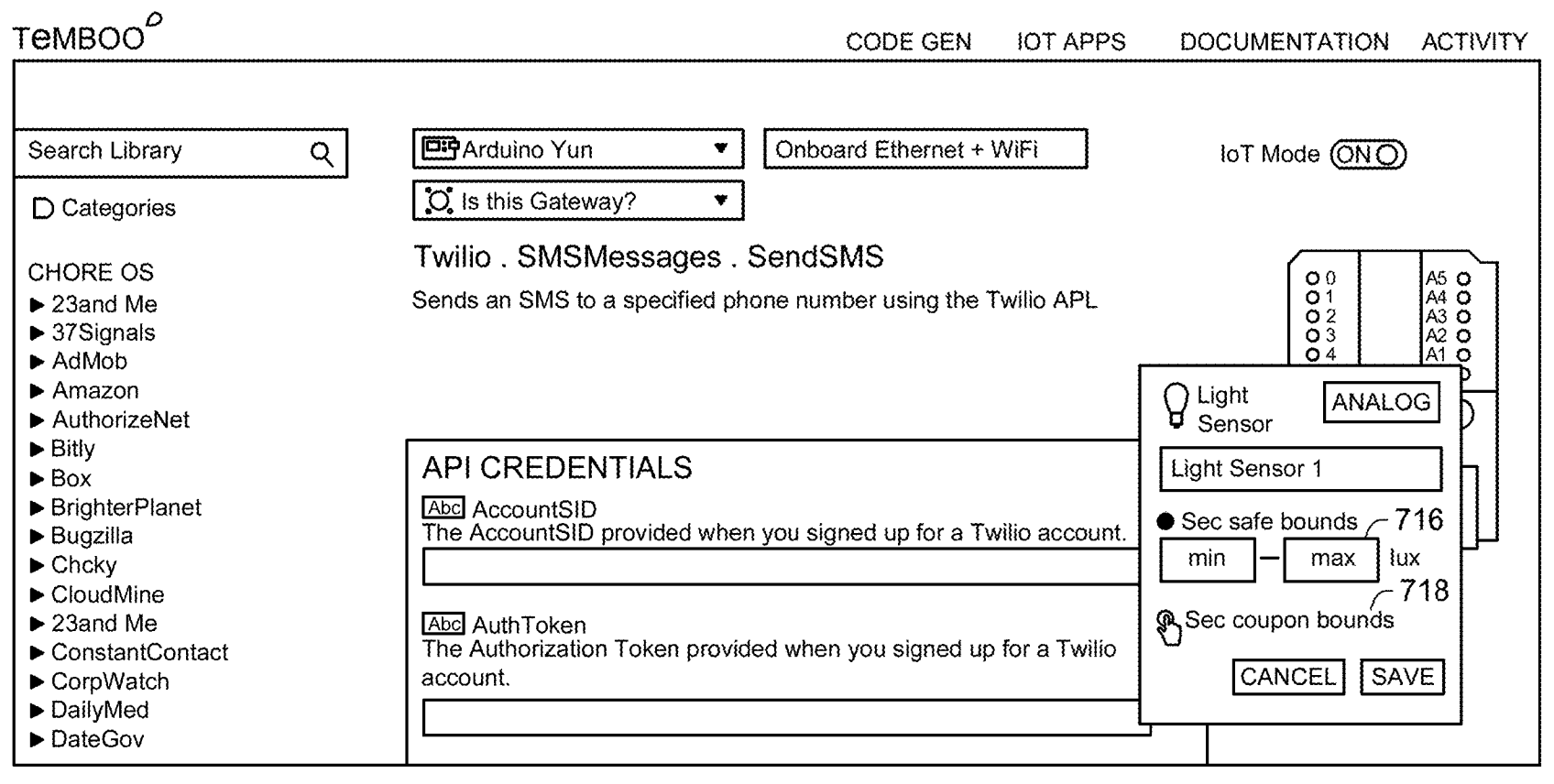
Figure 10:
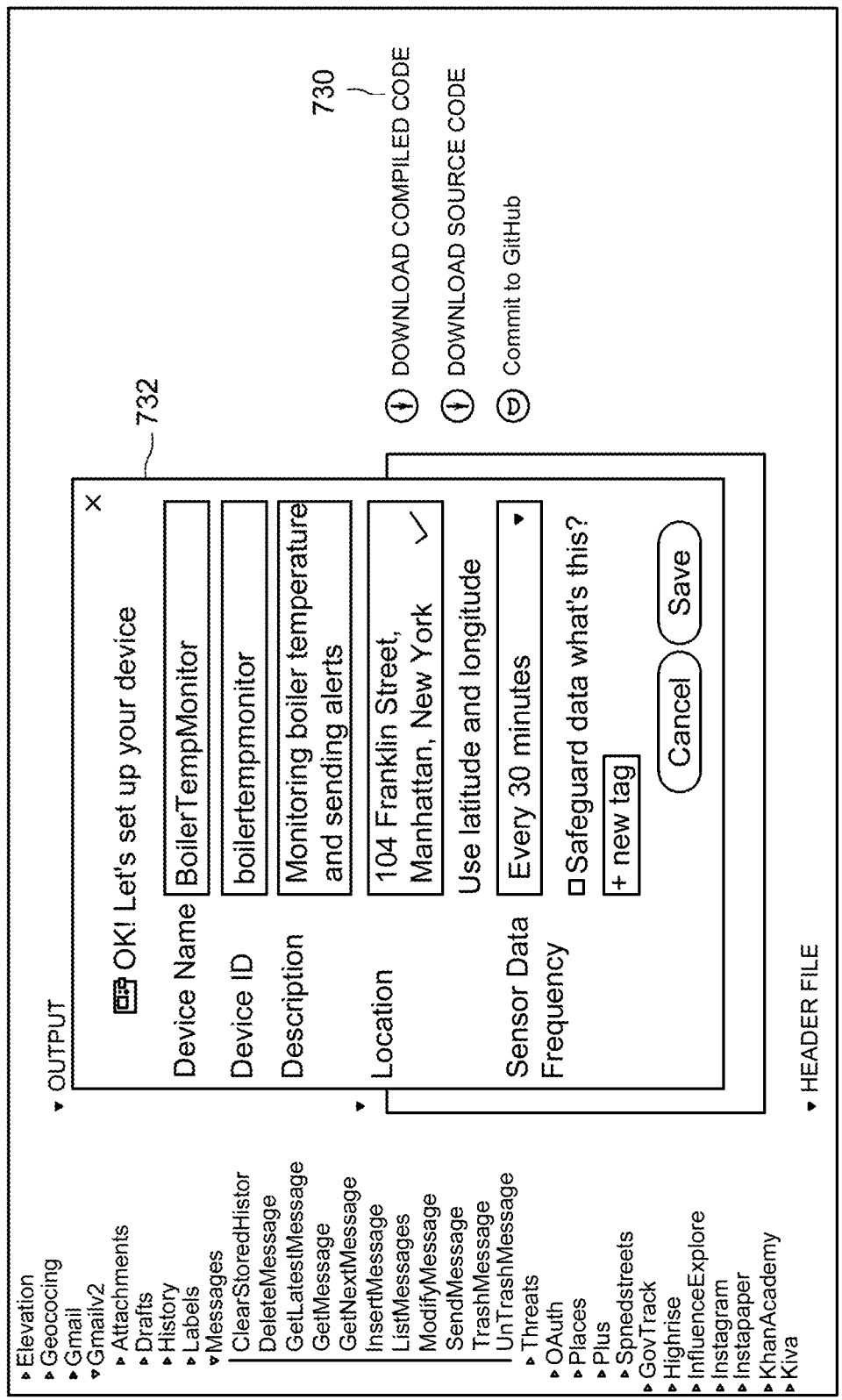
Figure 11:
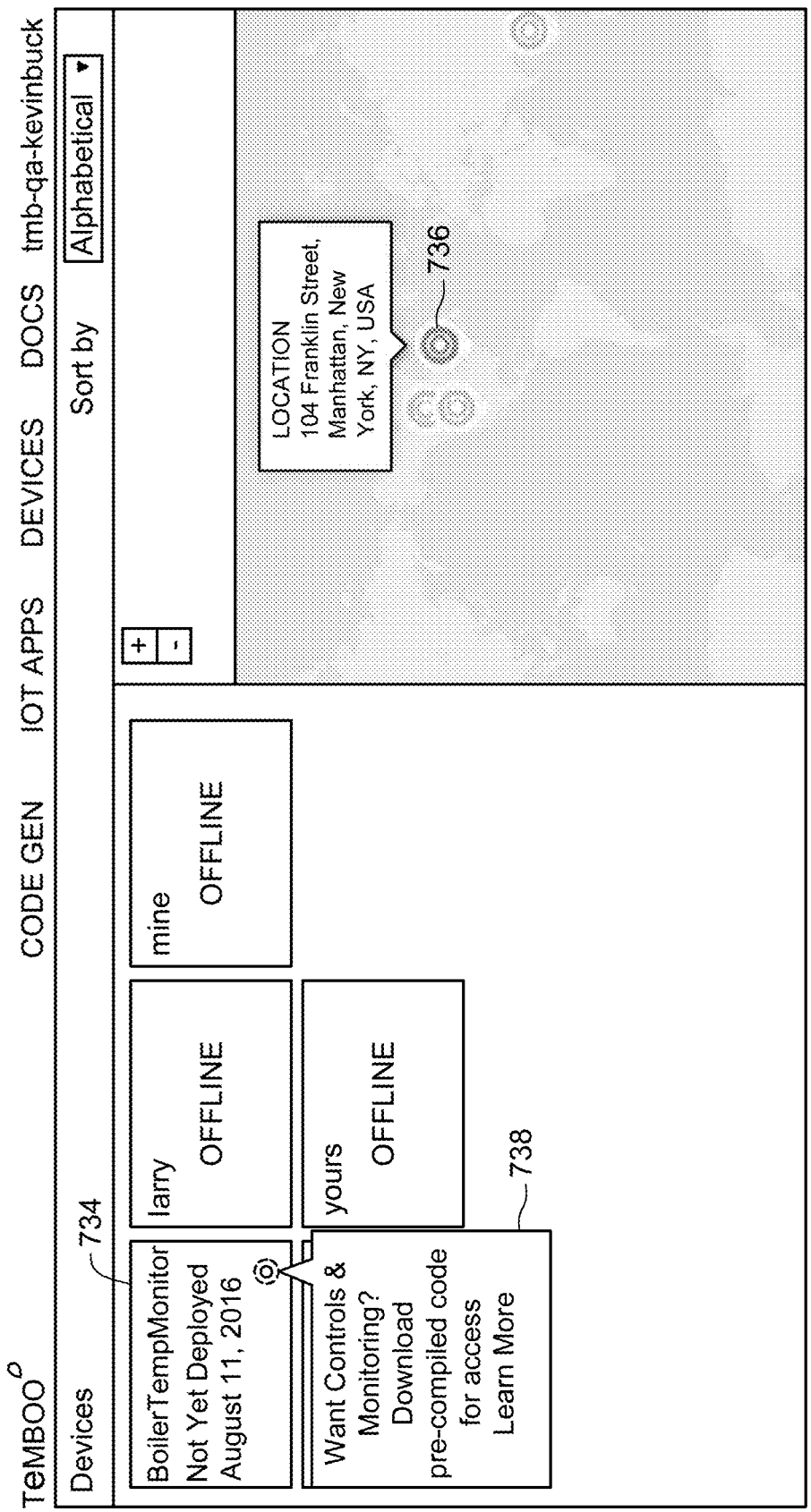
Figure 12:
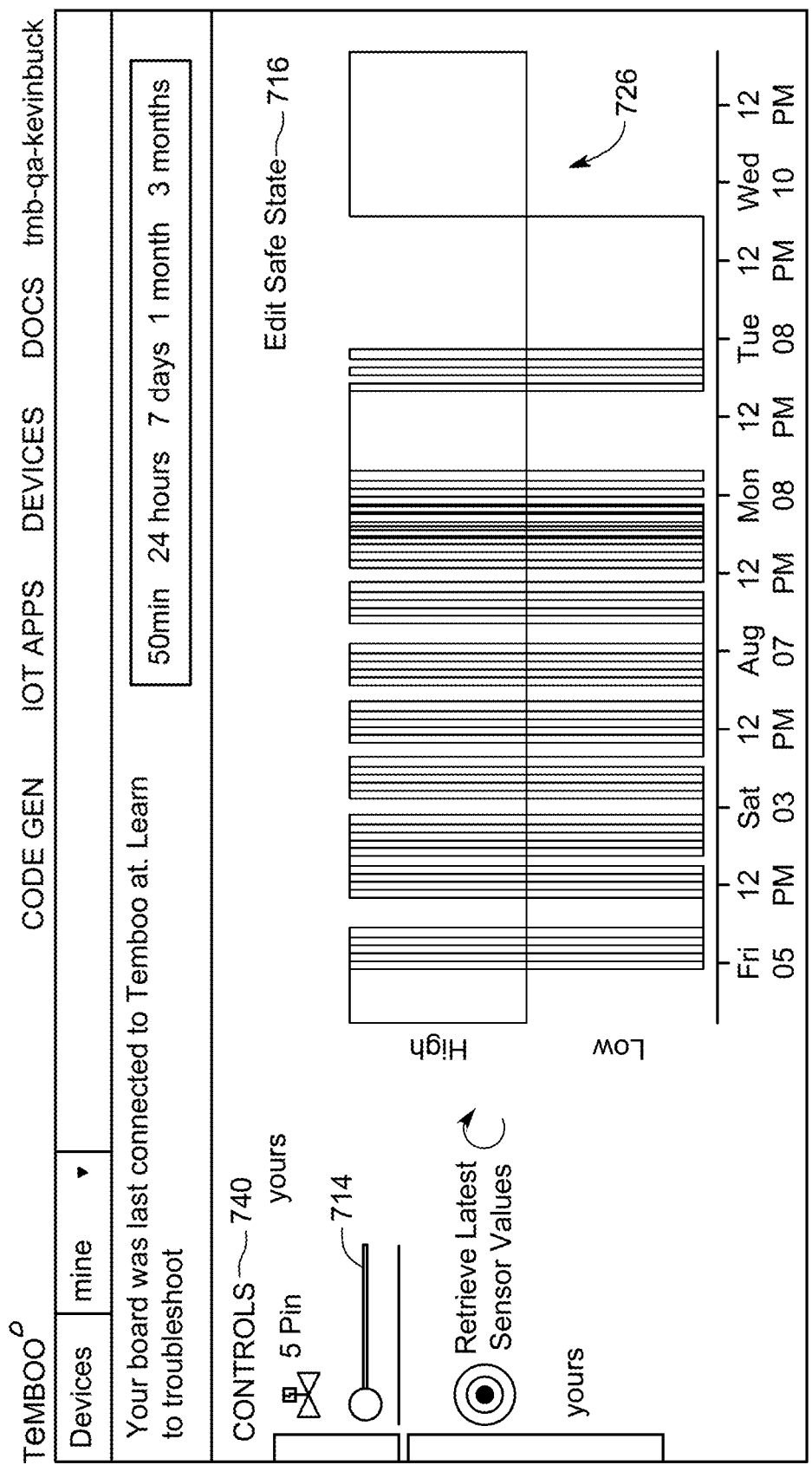

FIGS. 8-10 illustrate a partial graphical user interface (GUI) screens, illustrating several implementations of the GUI 700. In FIGS. 8-10, a user is programing or reprogramming of a controller device, and these figures illustrate an implementation of the GUI elements for selecting a controller device (702), selecting whether the controller device is an edge or gateway device (704), controller type (706), protocols (708), function or choreo (710), parameters (712), pins (714), additional parameters (720) such as selection of Internet of Things (IoT) mode, and conditions (724). In the GUI screen of FIG. 8, an Arduino Yun type controller is selected as a gateway, and configured to send an email via GMAIL provided by GOOGLE INC., upon certain conditions being met. FIG. 9 illustrates a GUI screen with additional GUI elements for providing input with respect to safe bounds (716) and caution bounds (718). The solutions configured in this manner are deployed, and may be monitored or modified at run time. For example, the GUI screen of FIG. 10 illustrates that the code generated for operating the controller device according to the techniques described with respect to embodiments herein is downloaded for deployment. UI element 730 allows for downloading the compiled code, and further, via UI element 732, allows for specifying the location and other parameters for the specific controller device to which the downloaded code will be deployed. The downloaded code is then deployed to the specified controller device by the user. FIGS. 8-10 relate to building solutions, and illustrate programming or reprogramming controller devices.

The programming or reprogramming of controller device, which pertains to building a solution is independent of monitoring and controlling such solutions, which includes modifying the parameters, conditions, analyzing the solution, for example, as discussed herein with respect to FIGS. 11-15. Therefore, monitoring and controlling the solutions (e.g. as illustrated with respect to FIGS. 11-15) do not require that the controller device be programmed or reprogrammed as shown in FIGS. 8-10. Further, the GUIs of FIGS. 8-10, which relate to building a solution, may be implemented on the code virtualization server 114, and the GUIs of FIGS. 11-15, which relate to monitoring and controlling the solution may be implemented via a server different than the code virtualization server 114, for example as also discussed above. GUIs for monitoring and controlling solutions depict similar or related parameters as depicted in building the solutions, and for the sake of simplicity, the GUIs of FIGS. 11-15 include the UI elements of the GUI 700, in addition to other UI elements.

Referring now to the GUIs of FIGS. 11-15 for monitoring and controlling the solutions, for monitoring, the specified controller device first needs to be selected. For example, the GUI screen of FIG. 11 displays several controller devices for which code is generated and deployed in a manner similar to that described above. The user selects a particular device for monitoring, for example, the user may select a controller device represented by a UI element 734, and further, the GUI screen of FIG. 11 displays the location of the device corresponding to the UI element 734 on a map, for example, by location pointer UI element 736. A UI element 738 allows the user to download code for accessing and monitoring the selected controller device. Upon deploying the code for accessing and monitoring the controller device, the user is able to access a GUI screen of FIG. 12, which shows monitored data visualization 726, UI element to edit safe bounds 716, UI element to reconfigure pins 714, and overall several other controls 740 related to the selected controller device. Various UI elements 730-740 may also be included in the UI 700 of FIG. 7.

Figure 13:
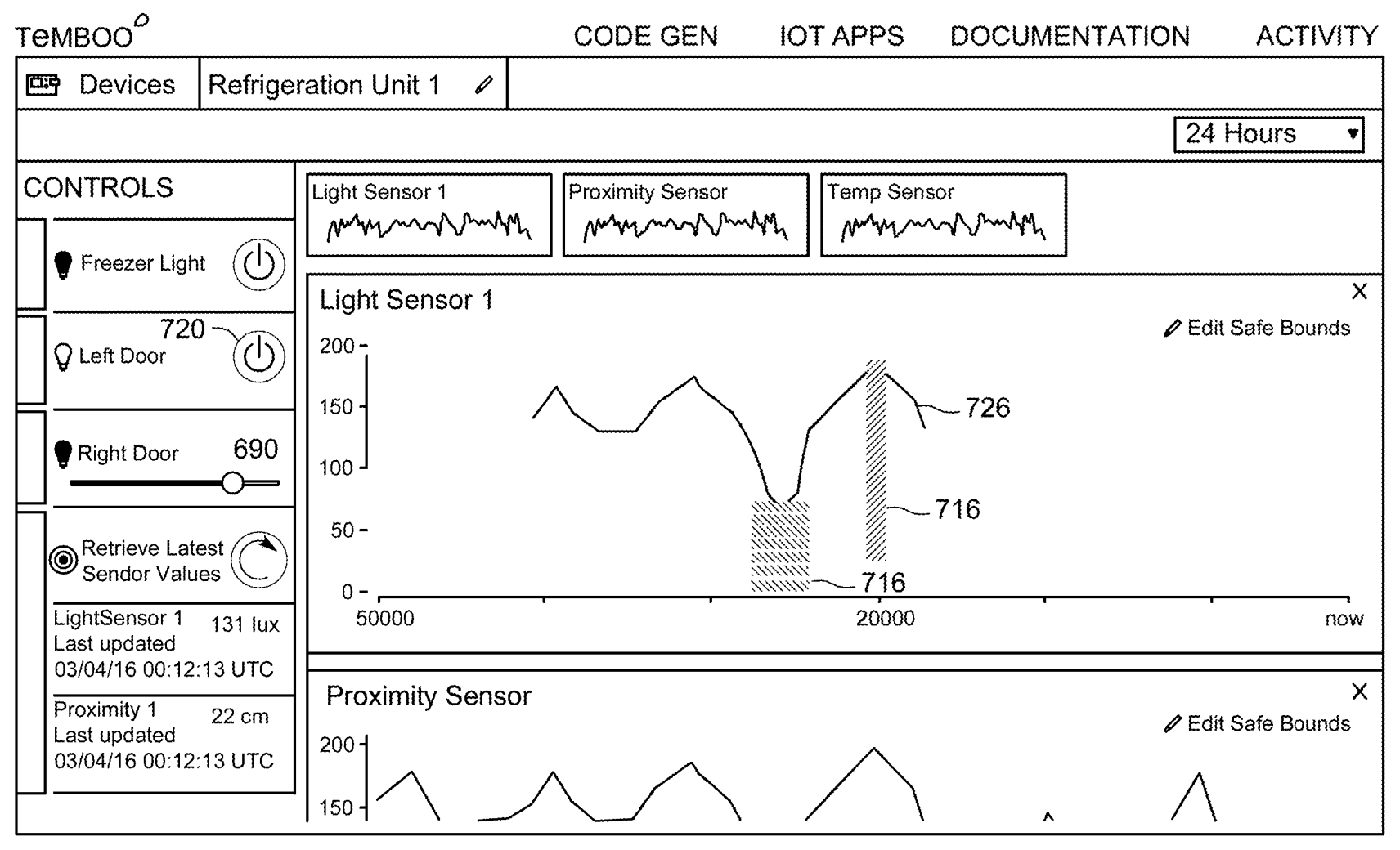

Further, and as additional examples, the GUI screen of FIG. 13 illustrates visualization of monitored data (726), and further a visualization of the safe bounds set during configuration of the solution, for example in the GUI screen of FIG. 9. For example, the visualization of monitored data 726 visualizes the safe bounds 716 with respect to the monitored data. The differently shaded portions of the monitored data of a light sensor indicate where the light sensor sensed data that was lower than (left) and higher (right) than the specified safe bounds. Further, the GUI element 720 relating to additional parameters is illustrated to enable a user to turn off or on a component of the solution, and for example, a light corresponding to the left door in the refrigeration unit 1 of FIG. 13.

Figure 14:
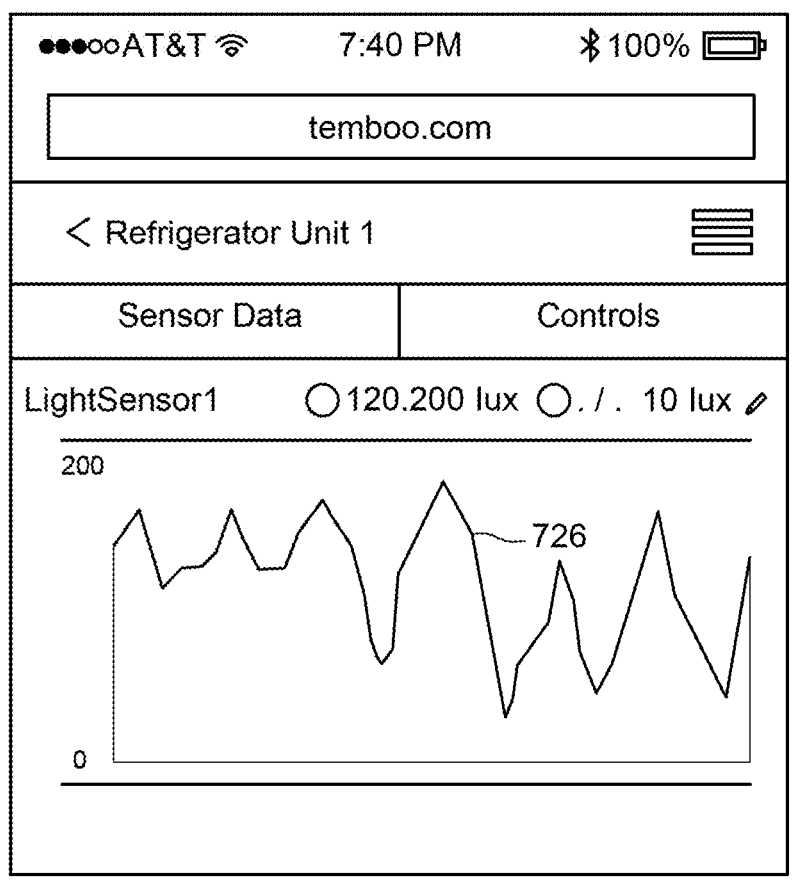
Figure 15:
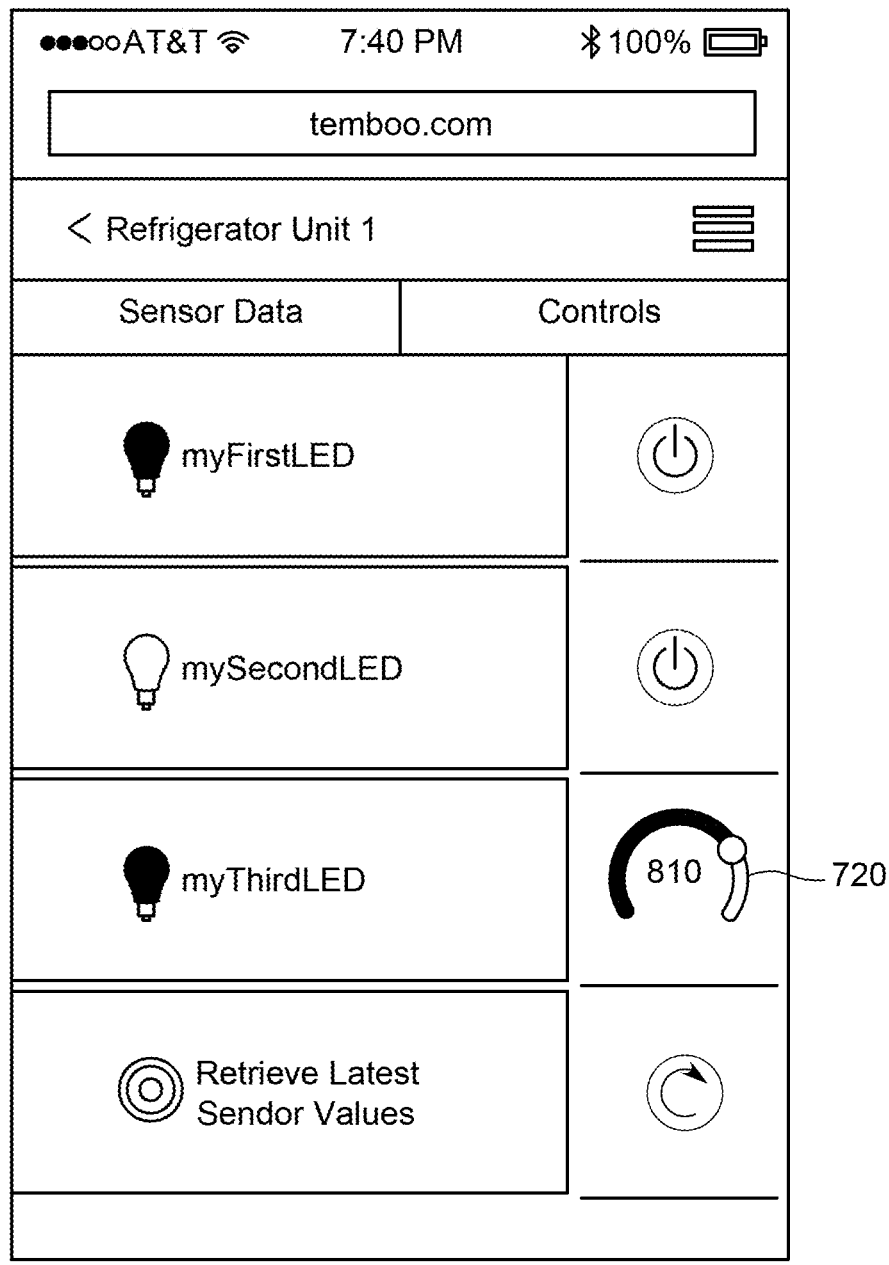

FIG. 14 illustrates a GUI screen implemented on a mobile device, such as a smartphone, and includes the GUI element 726 for visualization of monitored data in a manner similar to the GUI screen of FIG. 10. FIG. 15 illustrates a GUI screen implemented on a mobile device including the GUI element 720 with additional parameter for displaying a monitored value for a component of the solution, for example, the lumen levels of an LED. The GUI element 720 further enables a user to modify the lumen levels for the LED marked as myThirdLED, from the mobile device. According to some embodiments, various GUI elements, for example, as illustrated in the GUI 700 of FIG. 7, and other GUI elements corresponding to parameters of the solution may be presented on a GUI of a personal computer or a mobile device, and enables changing the code behavior of the AGCP and modification of the AGCP, in real time. That is, a user may configure desired information relating to the parameters of the solution, to be presented in the GUI 146 or 700, and modify the desired settings in response to the presented information or otherwise to modify the code behavior of the AGCP, or modify the AGCP itself.

Embodiments of the invention provide a solution centric approach to design, create and deploy controller based remote solutions, to operate and manage conventional systems. Embodiments of the invention also provide management of remote solutions thus created. Embodiments of the invention also provide enhancing the capacity of the remote solutions without requiring modification of the controller vices, for example, by effecting an update with the code virtualization server. The generation and provisioning of the GUIs as described above enable management and configuration of the controller based solutions in a mobile manner, greatly increasing the user convenience and flexibility in designing and managing the controller based remote solutions.

While the methods 300, 350 and 500 described herein utilize a user computer accessing the code virtualization server remotely to create and manage remote solutions, the remote solutions can be created and managed by accessing the code virtualization server directly. While the embodiments are described with respect to Internet of things (IoT) devices, those skilled in the art will readily appreciate that the techniques exemplified by the disclosed embodiments are applicable to several other programming environments.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for creating a controller based remote solution, comprising:
   receiving, at a code virtualization server (CVS), via a graphical user interface (GUI) of a user device remote to the CVS, at least one of
   a selection of a blank template in which a controller device is selected, and a solution corresponding to a conventional system is built via the GUI, or
   a selection of a pre-defined solution comprising a controller device installed in a conventional system, the controller device operable to monitor and control the conventional system, wherein the controller device and the conventional system are remote to the user device and the CVS;
   receiving, via the GUI, at the CVS, at least one parameter of the selected solution, the at least one parameter comprising at least one of a monitored parameter of the conventional system, a condition for the monitored parameter, or a remote program parameter for executing a remote program, wherein the remote program is executed remote to the user device and the controller device;

generating, on the CVS, an automatically generated controller program (AGCP) for execution by the controller device, the AGCP comprising a call for executing the remote program based on the condition being met; and sending the AGCP for installation on the controller device.

2. The method of claim 1 further comprising:

comparing the selected solution and the at least one parameter with at least one of a solutions library, a hardware library, or a process library;

determining, at the CVS, based on the comparing, if modification of at least one of the selected solution, the at least one parameter, the solutions library, the hardware library, or the process library is required; and sending the required modification for presentation via the GUI on the user device.

3. The method of claim 1, wherein the monitored parameter is monitored by an electronic device communicably coupled to the controller device, and wherein the electronic device is configured to actuate the monitored parameter, wherein the AGCP further comprises code for actuating the monitored parameter of the conventional system based on the condition being met.

4. The method of claim 3 further comprising:

generating, at the CVS, GUI information for displaying graphically, the at least one parameter, and a monitored data of the monitored parameter, wherein the at least one parameter comprises a boundary parameter related to the monitored parameter; and sending the GUI information for display via the GUI on the user device.

5. The method of claim 4, wherein the GUI information is sent for display via the GUI upon at least one of the monitored data being received from the electronic device, or upon a request received via the GUI of the user device.

6. The method of claim 4 further comprising:

receiving at the CVS, in response to the GUI information displayed via the GUI on the user device, an input to modify the at least one parameter;

modifying the AGCP according to the input to modify the at least one parameter; and sending the modified AGCP for installation on the controller device.

7. The method of claim 4, further comprising:

receiving, at the CVS, the call from the controller device to execute the remote program, the call comprising the remote program parameter;

executing the remote program on the CVS; and if the data is generated as a result of executing the remote program, sending the data to the controller device, wherein the call further comprises instructions to execute a remote service on a device remote to the CVS, the user device, and the controller device, and wherein the remote program parameters comprise parameters to execute the remote service.

8. The method of claim 1, wherein the GUI of the user device is generated by a GUI generation module on the CVS.

9. The method of claim 8, further comprising:

generating a modification GUI for display on the user device, the modification GUI comprising a first option for displaying at least one of parameter data from a sensor or an actuator, the condition, the remote program parameter, or the remote program, receiving input for changing any one or more of the condition, and a second option for receiving input for changing at least one of the parameter, the condition, the remote program parameter, the remote program; and sending the modification GUI to the user device for display on the user device, wherein the controller device monitors the conventional system using the sensor coupled thereto, and controls the conventional system using the actuator coupled thereto.

10. The method of claim 9, further comprising:

generating, on the GUI generation module, a modified AGCP for execution by the controller device, the modified AGCP comprising a call for executing the remote program based on the condition being met; and sending the modified AGCP for installation on the controller device, wherein either the GUI generation module is implemented on the CVS, or the GUI generation module is implemented on a GUI generation device remote to the CVS, the user device, and the controller device, and wherein the GUI generation device is communicably coupled to at least one of the CVS, the user device, or the controller device.

11. An apparatus for a controller based remote solution, comprising:

at least one processor; and a memory comprising executable instructions, which when executed using the at least one processor, cause execution of a method comprising:

receiving, at a code virtualization server (CVS), via a graphical user interface (GUI) of a user device remote to the CVS, at least one of a selection of a blank template in which a controller device is selected, and a solution corresponding to a conventional system is built via the GUI, or a selection of a pre-defined solution comprising a controller device installed in a conventional system, the controller device operable to monitor and control the conventional system, wherein the controller device and the conventional system are remote to the user device and the CVS, receiving, via the GUI, at the CVS, at least one parameter of the selected solution, the at least one parameter comprising at least one of a monitored parameter of the conventional system, a condition for the monitored parameter, or a remote program parameter for executing a remote program, wherein the remote program is executed remote to the user device and the controller device, generating, on the CVS, an automatically generated controller program (AGCP) for execution by the controller device, the AGCP comprising a call for executing the remote program based on the condition being met, and sending the AGCP for installation on the controller device.

12. The apparatus of claim 11, wherein the method further comprises:

comparing the selected solution and the at least one parameter with at least one of a solutions library, a hardware library, or a process library, determining, at the CVS, based on the comparing, if modification of at least one of the selected solution, the at least one parameter, the solutions library, the hardware library, or the process library is required, and sending the required modification for presentation via the GUI on the user device.

13. The apparatus of claim 11, wherein the monitored parameter is monitored by an electronic device communicably coupled to the controller device, and wherein the electronic device is configured to actuate the monitored parameter, wherein the AGCP further comprises code for actuating the monitored parameter of the conventional system based on the condition being met.

14. The apparatus of claim 13, wherein the method further comprises:
    generating, at the CVS, GUI information for displaying graphically, the at least one parameter, and a monitored data of the monitored parameter, wherein the at least one parameter comprises a boundary parameter related to the monitored parameter, and
    sending the GUI information for display via the GUI on the user device.

15. The apparatus of claim 14, wherein the GUI information is sent for display via the GUI upon at least one of the monitored data being received from the electronic device, or upon a request received via the GUI of the user device.

16. The apparatus of claim 14, wherein the method further comprises:
    receiving at the CVS, in response to the GUI information displayed via the GUI on the user device, an input to modify the at least one parameter,
    modifying the AGCP according to the input to modify the at least one parameter, and
    sending the modified AGCP for installation on the controller device.

17. The apparatus of claim 14, wherein the method further comprises:
    receiving, at the CVS, the call from the controller device to execute the remote program, the call comprising the remote program parameter,
    executing the remote program on the CVS, and
    if the data is generated as a result of executing the remote program, sending the data to the controller device, wherein the call further comprises instructions to execute a remote service on a device remote to the CVS, the user device, and the controller device, and wherein the remote program parameters comprise parameters to execute the remote service.

18. The apparatus of claim 11, wherein the GUI of the user device is generated by a GUI generation module.

19. The apparatus of claim 18, wherein method further comprises:
    generating a modification GUI for display on the user device, the modification GUI comprising a first option for displaying at least one of parameter data from a sensor or an actuator, the condition, the remote program parameter, or the remote program, receiving input for changing any one or more of the condition, and a second option for receiving input for changing at least one of the parameter, the condition, the remote program parameter, the remote program; and
    sending the modification GUI to the user device for display on the user device,
    wherein the controller device monitors the conventional system using the sensor coupled thereto, and controls the conventional system using the actuator coupled thereto.

20. The apparatus of claim 19, wherein the method further comprises:
    generating, on the GUI generation module, a modified AGCP for execution by the controller device, the modified AGCP comprising a call for executing the remote program based on the condition being met; and
    sending the modified AGCP for installation on the controller device,
    wherein either the GUI generation module is implemented on the CVS, or the GUI generation module is implemented on a GUI generation device remote to the CVS, the user device, and the controller device, and wherein the GUI generation device is communicably coupled to at least one of the CVS, the user device, or the controller device.

* * * * *